US012761916B2

(12) United States Patent
O'Farrell et al.

(10) Patent No.: US 12,761,916 B2
(45) Date of Patent: Oct. 13, 2026

(54) MANAGING PORTS OF SOFTWARE PROJECTS

(71) Applicant: International Business Machines Corporation, Armonk, NY (US)

(72) Inventors: William Gerald O'Farrell, Markham (CA); Igor Todorovski, Toronto (CA); Chi Wai Cheung, Richmond Hill (CA); Zhilong Gan, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 18/753,415

(22) Filed: Jun. 25, 2024

(65) Prior Publication Data

US 2025/0390301 A1 Dec. 25, 2025

(51) Int. Cl.
*G06F 8/76* (2018.01)
*G06F 8/71* (2018.01)

(52) U.S. Cl.
CPC . *G06F 8/76* (2013.01); *G06F 8/71* (2013.01)

(58) Field of Classification Search
CPC .................................... G06F 8/76; G06F 8/71
See application file for complete search history.

(56) References Cited

U.S. PATENT DOCUMENTS 8,413,130 B2 * 4/2013 Madduri ............... G06F 21/572 717/170
8,433,687 B1 * 4/2013 Pydi .......................... G06F 8/71 707/672
9,430,229 B1 * 8/2016 Van Zijst .............. G06F 9/3844
10,114,637 B1 10/2018 Willson et al.
10,915,316 B1 * 2/2021 Turner .................. G06F 9/3844
12,386,598 B2 * 8/2025 Cherivirala ............. G06F 8/433
2014/0047436 A1 * 2/2014 Jayachandran ........... G06F 8/65 718/1
2015/0106663 A1 * 4/2015 Richter ............... G06F 11/3636 714/45
2015/0363294 A1 * 12/2015 Carback, III ............ G06F 8/70 717/132

(Continued)

FOREIGN PATENT DOCUMENTS

CN 110825650 B * 4/2023
EP 0117281 B1 * 7/1989 ........... G06F 40/166

*Primary Examiner* — Daxin Wu
(74) *Attorney, Agent, or Firm* — Yee & Associates, P.C.

(57) ABSTRACT

Managing software project ports is provided. A comparison of a second hash of content in an upstream file corresponding to a computing platform of a parent software project to a first hash of the content in the upstream file retrieved from a hash-based comment inserted in a downstream platform-specific file corresponding to a heterogeneous computing platform is performed. It is determined that a set of changes made to the upstream file corresponding to the computing platform of the parent software project applies to the downstream platform-specific file corresponding to the heterogeneous computing platform based on the comparison. A notification is sent to a developer of the downstream platform-specific file corresponding to the heterogeneous computing platform regarding the set of changes made to the upstream file corresponding to the computing platform of the parent software project on which the downstream platform-specific file was based.

14 Claims, 12 Drawing Sheets

(56) References Cited

U.S. PATENT DOCUMENTS

| | | | | |
|---|---|---|---|---|
| 2016/0055171 | A1* | 2/2016 | Araki | G06F 16/178 707/624 |
| 2016/0188651 | A1* | 6/2016 | Abadi | G06F 16/84 707/691 |
| 2017/0235568 | A1* | 8/2017 | Cowan | G06F 8/73 717/122 |
| 2018/0052682 | A1* | 2/2018 | Fox | G06F 8/71 |
| 2018/0088936 | A1* | 3/2018 | Tanimoto | G06F 8/65 |
| 2020/0379752 | A1 | 12/2020 | Rodrigues Rosa Junior | |
| 2024/0069907 | A1* | 2/2024 | Groenewegen | G06F 8/33 |

* cited by examiner

MANAGING PORTS OF SOFTWARE PROJECTS

BACKGROUND

The disclosure relates generally to porting and more specifically to managing ports of software projects.

Porting is the process of adapting software to execute in a computing platform, architecture, or environment that is different (e.g., different processor, operating system, third party library, or the like) from the computing platform the software was originally designed for.

SUMMARY

According to one illustrative embodiment, a computer-implemented method for managing software project ports is provided. A computer performs a comparison of a second hash of content in an upstream file corresponding to a computing platform of a parent software project to a first hash of the content in the upstream file retrieved from a hash-based comment inserted in a downstream platform-specific file corresponding to a heterogeneous computing platform. The computer determines that a set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file. The computer sends a notification to a developer of the downstream platform-specific file corresponding to the heterogeneous computing platform regarding the set of changes made to the upstream file corresponding to the computing platform of the parent software project on which the downstream platform-specific file was based. According to other illustrative embodiments, a computer system and computer program product for managing software project ports are provided.

DETAILED DESCRIPTION

Figure 1:
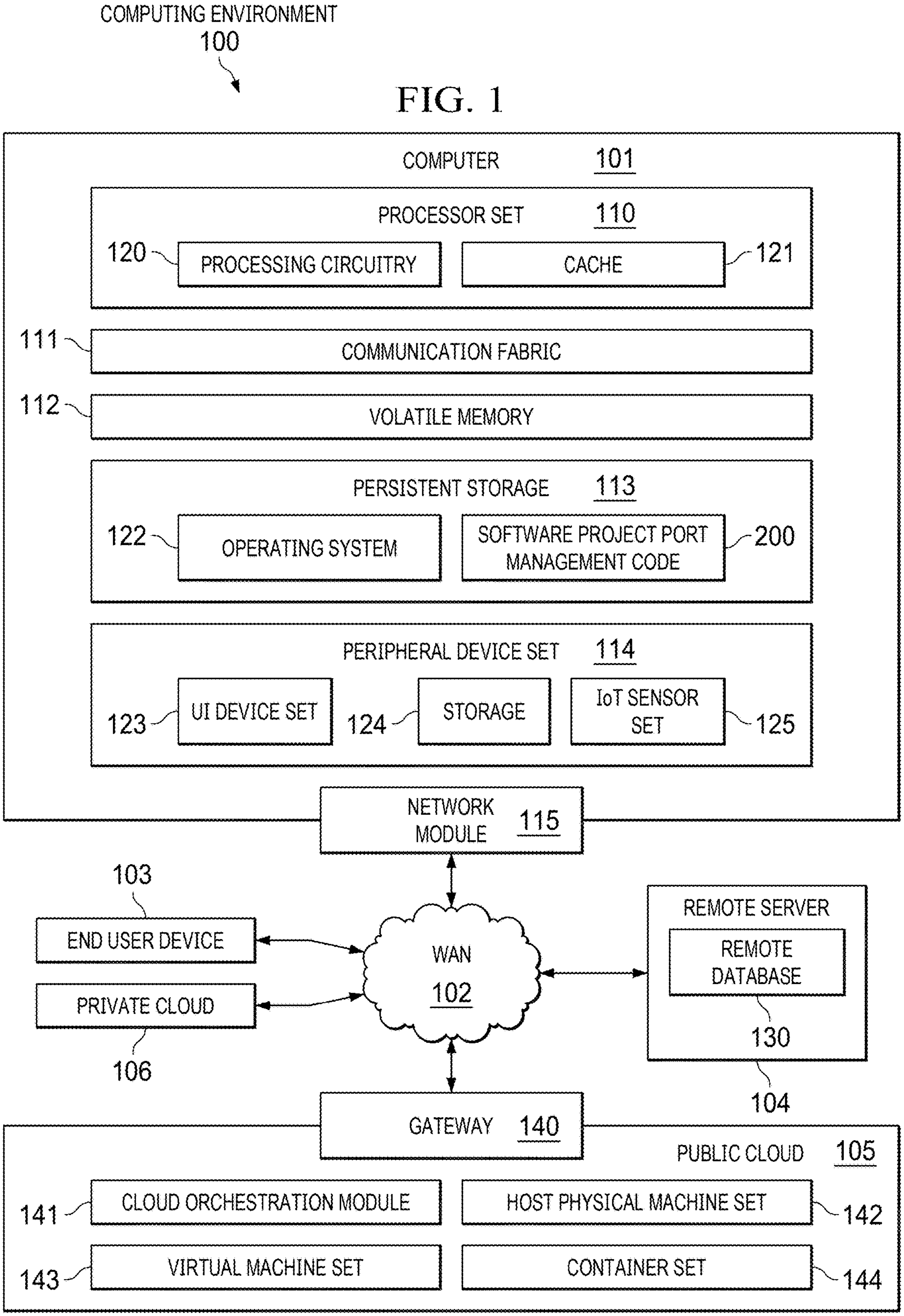
FIG. 1 is a pictorial representation of a computing environment in which illustrative embodiments may be implemented.

A computer-implemented method provides managing software project ports. A computer performs a comparison of a second hash of content in an upstream file corresponding to a computing platform of a parent software project to a first hash of the content in the upstream file retrieved from a hash-based comment inserted in a downstream platform-specific file corresponding to a heterogeneous computing platform. The computer determines that a set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file. The computer sends a notification to a developer of the downstream platform-specific file corresponding to the heterogeneous computing platform regarding the set of changes made to the upstream file corresponding to the computing platform of the parent software project on which the downstream platform-specific file was based. As a result, illustrative embodiments provide a technical effect of determining that a set of changes made to an upstream file corresponding to a computing platform of a parent software project applies to a downstream platform-specific file corresponding to a heterogeneous computing platform based on comparing a hash of content in the upstream file to a hash of content in the upstream file retrieved from a hash-based comment inserted in the downstream platform-specific file thereby increasing efficiency of identifying changes to an upstream file that need to be applied to a downstream platform-specific file corresponding to a heterogeneous computing platform for porting.

Also, the computer implements the set of changes made to the upstream file corresponding to the computing platform of the parent software project in the downstream platform-specific file corresponding to the heterogeneous computing platform automatically. As a result, illustrative embodiments provide a technical effect of automatically implementing changes made to an upstream file corresponding to a computing platform of a parent software project in a downstream platform-specific file corresponding to a heterogeneous computing platform for porting thereby improving the functioning of the heterogeneous computing platform because the software is automatically configured to execute on the heterogeneous computing platform.

In addition, the computer determines that the downstream platform-specific file corresponding to the heterogeneous computing platform is related to the upstream file corresponding to the computing platform of the parent software project based on a number of functions and constant variables in common between the downstream platform-specific file and the upstream file exceeding a defined minimum commonality threshold level. The computer generates the first hash of the content in the upstream file corresponding to the computing platform of the parent software project based on determining that the downstream platform-specific file corresponding to the heterogeneous computing platform is related to the upstream file. The computer inserts the hash-based comment in the downstream platform-specific file corresponding to the heterogeneous computing platform in response to generating the first hash of the content in the upstream file corresponding to the computing platform of the parent software project. The hash-based comment includes the first hash of the content in the upstream file. As a result, illustrative embodiments provide a technical effect of inserting a hash-based comment, which includes a hash of content in an upstream file, within a downstream platform-specific file corresponding to a heterogeneous computing platform for efficient comparison of hashes.

Further, the computer monitors a centralized source code control repository for any changes. The computer determines whether the set of changes has been committed to the centralized source code control repository based on monitoring the centralized source code control repository for any changes. As a result, illustrative embodiments provide a technical effect of determining whether changes have been committed to a centralized source code control repository.

Furthermore, in response to the computer determining that the set of changes has been committed to the centralized source code control repository based on monitoring the centralized source code control repository for any changes, the computer generates the second hash of the content in the upstream file corresponding to the computing platform of the parent software project. The computer retrieves the first hash of the content in the upstream file corresponding to the computing platform of the parent software project from the hash-based comment inserted in the downstream platform-specific file corresponding to the heterogeneous computing platform. As a result, illustrative embodiments provide a technical effect of generating a second hash of content in an upstream file corresponding to a computing platform of a parent software project and retrieving a first hash of content in the upstream file from a hash-based comment inserted in a downstream platform-specific file corresponding to a heterogeneous computing platform for efficient comparison of the hashes to identify whether the changes to the upstream file apply to the downstream platform-specific file for porting.

Moreover, the computer performs a function call graph analysis to determine platform-specific implementation changes at a function level. As a result, illustrative embodiments provide a technical effect of determining platform-specific implementation changes at a function level using function call graph analysis.

The computer also performs an abstract syntax tree analysis to determine platform-specific implementation changes at a statement level for a given function. As a result, illustrative embodiments provide a technical effect of determining platform-specific implementation changes at a statement level for a given function using abstract syntax tree analysis.

A computer system for managing software project ports comprises a communication fabric, a set of computer-readable storage media connected to the communication fabric, where the set of computer-readable storage media collectively stores program instructions, and a set of processors connected to the communication fabric, where the set of processors executes the program instructions. The computer system performs a comparison of a second hash of content in an upstream file corresponding to a computing platform of a parent software project to a first hash of the content in the upstream file retrieved from a hash-based comment inserted in a downstream platform-specific file corresponding to a heterogeneous computing platform. The computer system determines that a set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file. The computer system sends a notification to a developer of the downstream platform-specific file corresponding to the heterogeneous computing platform regarding the set of changes made to the upstream file corresponding to the computing platform of the parent software project on which the downstream platform-specific file was based. As a result, illustrative embodiments provide a technical effect of determining that a set of changes made to an upstream file corresponding to a computing platform of a parent software project applies to a downstream platform-specific file corresponding to a heterogeneous computing platform based on comparing a hash of content in the upstream file to a hash of content in the upstream file retrieved from a hash-based comment inserted in the downstream platform-specific file thereby increasing efficiency of identifying changes to an upstream file that need to be applied to a downstream platform-specific file corresponding to a heterogeneous computing platform for porting.

Also, the computer system implements the set of changes made to the upstream file corresponding to the computing platform of the parent software project in the downstream platform-specific file corresponding to the heterogeneous computing platform automatically. As a result, illustrative embodiments provide a technical effect of automatically implementing changes made to an upstream file corresponding to a computing platform of a parent software project in a downstream platform-specific file corresponding to a heterogeneous computing platform for porting thereby improving the functioning of the heterogeneous computing platform because the software is automatically configured to execute on the heterogeneous computing platform.

In addition, the computer system determines that the downstream platform-specific file corresponding to the heterogeneous computing platform is related to the upstream file corresponding to the computing platform of the parent software project based on a number of functions and constant variables in common between the downstream platform-specific file and the upstream file exceeding a defined minimum commonality threshold level. The computer system generates the first hash of the content in the upstream file corresponding to the computing platform of the parent software project based on determining that the downstream platform-specific file corresponding to the heterogeneous computing platform is related to the upstream file. The computer system inserts the hash-based comment in the downstream platform-specific file corresponding to the heterogeneous computing platform in response to generating the first hash of the content in the upstream file corresponding to the computing platform of the parent software project. The hash-based comment includes the first hash of the content in the upstream file. As a result, illustrative embodiments provide a technical effect of inserting a hash-based comment, which includes a hash of content in an upstream file, within a downstream platform-specific file corresponding to a heterogeneous computing platform for efficient comparison of hashes.

Further, the computer system monitors a centralized source code control repository for any changes. The computer system determines whether the set of changes has been committed to the centralized source code control repository based on monitoring the centralized source code control repository for any changes. As a result, illustrative embodiments provide a technical effect of determining whether changes have been committed to a centralized source code control repository.

Furthermore, the computer system generates the second hash of the content in the upstream file corresponding to the computing platform of the parent software project in response to determining that the set of changes has been committed to the centralized source code control repository based on monitoring the centralized source code control repository for any changes. The computer system retrieves the first hash of the content in the upstream file corresponding to the computing platform of the parent software project from the hash-based comment inserted in the downstream platform-specific file corresponding to the heterogeneous computing platform. As a result, illustrative embodiments provide a technical effect of generating a second hash of content in an upstream file corresponding to a computing platform of a parent software project and retrieving a first hash of content in the upstream file from a hash-based comment inserted in a downstream platform-specific file corresponding to a heterogeneous computing platform for efficient comparison of the hashes to identify whether the changes to the upstream file apply to the downstream platform-specific file for porting.

Moreover, the computer system performs a function call graph analysis to determine platform-specific implementation changes at a function level. As a result, illustrative embodiments provide a technical effect of determining platform-specific implementation changes at a function level using function call graph analysis.

A computer program product for managing software project ports comprises a set of computer-readable storage media having program instructions collectively stored therein, the program instructions executable by a computer. The computer performs a comparison of a second hash of content in an upstream file corresponding to a computing platform of a parent software project to a first hash of the content in the upstream file retrieved from a hash-based comment inserted in a downstream platform-specific file corresponding to a heterogeneous computing platform. The computer determines that a set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file. The computer sends a notification to a developer of the downstream platform-specific file corresponding to the heterogeneous computing platform regarding the set of changes made to the upstream file corresponding to the computing platform of the parent software project on which the downstream platform-specific file was based. As a result, illustrative embodiments provide a technical effect of determining that a set of changes made to an upstream file corresponding to a computing platform of a parent software project applies to a downstream platform-specific file corresponding to a heterogeneous computing platform based on comparing a hash of content in the upstream file to a hash of content in the upstream file retrieved from a hash-based comment inserted in the downstream platform-specific file thereby increasing efficiency of identifying changes to an upstream file that need to be applied to a downstream platform-specific file corresponding to a heterogeneous computing platform for porting.

Also, the computer implements the set of changes made to the upstream file corresponding to the computing platform of the parent software project in the downstream platform-specific file corresponding to the heterogeneous computing platform automatically. As a result, illustrative embodiments provide a technical effect of automatically implementing changes made to an upstream file corresponding to a computing platform of a parent software project in a downstream platform-specific file corresponding to a heterogeneous computing platform for porting thereby improving the functioning of the heterogeneous computing platform because the software is automatically configured to execute on the heterogeneous computing platform.

In addition, the computer determines that the downstream platform-specific file corresponding to the heterogeneous computing platform is related to the upstream file corresponding to the computing platform of the parent software project based on a number of functions and constant variables in common between the downstream platform-specific file and the upstream file exceeding a defined minimum commonality threshold level. The computer generates the first hash of the content in the upstream file corresponding to the computing platform of the parent software project based on determining that the downstream platform-specific file corresponding to the heterogeneous computing platform is related to the upstream file. The computer inserts the hash-based comment in the downstream platform-specific file corresponding to the heterogeneous computing platform in response to generating the first hash of the content in the upstream file corresponding to the computing platform of the parent software project. The hash-based comment includes the first hash of the content in the upstream file. As a result, illustrative embodiments provide a technical effect of inserting a hash-based comment, which includes a hash of content in an upstream file, within a downstream platform-specific file corresponding to a heterogeneous computing platform for efficient comparison of hashes.

Further, the computer monitors a centralized source code control repository for any changes. The computer determines whether the set of changes has been committed to the centralized source code control repository based on monitoring the centralized source code control repository for any changes. As a result, illustrative embodiments provide a technical effect of determining whether changes have been committed to a centralized source code control repository.

Furthermore, the computer generates the second hash of the content in the upstream file corresponding to the computing platform of the parent software project in response to determining that the set of changes has been committed to the centralized source code control repository based on monitoring the centralized source code control repository for any changes. The computer retrieves the first hash of the content in the upstream file corresponding to the computing platform of the parent software project from the hash-based comment inserted in the downstream platform-specific file corresponding to the heterogeneous computing platform. As a result, illustrative embodiments provide a technical effect of generating a second hash of content in an upstream file corresponding to a computing platform of a parent software project and retrieving a first hash of content in the upstream file from a hash-based comment inserted in a downstream platform-specific file corresponding to a heterogeneous computing platform for efficient comparison of the hashes to identify whether the changes to the upstream file apply to the downstream platform-specific file for porting.

Moreover, the computer performs a function call graph analysis to determine platform-specific implementation changes at a function level. As a result, illustrative embodiments provide a technical effect of determining platform-specific implementation changes at a function level using function call graph analysis.

The computer also performs an abstract syntax tree analysis to determine platform-specific implementation changes at a statement level for a given function. As a result, illustrative embodiments provide a technical effect of determining platform-specific implementation changes at a statement level for a given function using abstract syntax tree analysis.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environment in which different embodiments may be implemented. Many modifications to the depicted environment may be made.

FIG. 1 shows a pictorial representation of a computing environment in which illustrative embodiments may be implemented. Computing environment 100 contains an example of a platform, architecture, or environment for the execution of at least some of the computer code involved in performing the inventive methods of illustrative embodiments, such as software project port management code 200. For example, software project port management code 200 detects platform-specific changes in upstream files corresponding to computing platforms of parent software projects, triggering notifications to developers of downstream platform-specific files corresponding to heterogenous computing platforms to allow the developers to determine whether the platform-specific changes apply to their downstream platform-specific files, which were based on the upstream files. In other words, downstream platform-specific files corresponding to heterogenous computing platforms are based on upstream files corresponding to computing platforms of parent software projects. Thus, upstream files are parent files on which developers base their downstream files on.

In addition to software project port management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and software project port management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, smart phone, smart watch or other wearable computer, or any other form of computer or mobile device now known or to be developed in the future that is capable of, for example, running a program, accessing a network, and querying a database, such as remote database 130. Remote database 130 can be, for example, a remote source code control repository. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in software project port management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. Persistent storage 113 can include, for example, a local source code control repository. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a developer of a downstream platform-specific file corresponding to a heterogeneous type of computing platform), and may take any of the forms discussed above in connection with computer 101. EUD 103 typically receives helpful and useful data from the operations of computer 101. For example, in a hypothetical case where computer 101 is designed to provide an upstream file change notification to the end user, this upstream file change notification would typically be communicated from network module 115 of computer 101 through WAN 102 to EUD 103. In this way, EUD 103 can display, or otherwise present, the upstream file change notification to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101.

Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an upstream file change notification based on upstream file changes committed to remote database 130, then these upstream file changes committed to remote database 130 can be communicated to computer 101 by remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

When a developer creates a new software project based on an existing software project, sometimes the developer discovers that the program code of the new software project cannot be merged into the existing parent software project. For example, the developer wants to port an existing parent open-source software project to a new heterogeneous computing platform that is different from the computing platform the existing parent open-source software project was designed for originally. However, the existing parent software project may not be able to incorporate the changes necessary to support the new heterogeneous computing platform. In addition, the existing parent software project continues to evolve on a daily basis with changes to the program code that, for example, add features, fix bugs, and the like. One issue that arises in the child software project is that the child software project tries to keep up with the evolution of the existing parent software project. The problem is that as changes are made to the upstream files corresponding to the existing parent software project, those upstream file changes will miss being made to local downstream files on a local repository corresponding to the child software project, which pertain to the new heterogeneous computing platform.

There are two common methods to change or modify program code of software projects being adapted to new heterogeneous computing platforms. The first method is to add new files to the software project, which is to be ported to the new heterogenous computing platform, that contain platform-specific program code. The second method is to apply platform-specific program code to sections of the software project that detect which computing platform the program code is running on.

As an example of the first method, assume upstream file "blah.go," which is located in a centralized repository, was copied into a local downstream platform-specific file blah.PLAT.go on a local repository, with the downstream platform-specific file blah.PLAT.go containing appropriate changes specifically for a particular type of computing platform. It should be noted that the GO® (a registered trademark of Google LLC, Mountain View, California, USA) programming language is intended as an example only and not as a limitation on illustrative embodiments. For example, illustrative embodiments can apply to any type of programming language for any type of computing platform. Also, assume a bug was detected and fixed in upstream file blah.go. As the developer incorporates upstream file blah.go changes into the local downstream platform-specific file blah.PLAT.go that pertains to a new heterogenous computing platform, upstream file blah.go continues to be changed. However, the developer of the local downstream platform-specific file blah.PLAT.go can miss those recent changes to upstream file blah.go.

Similarly, in the second method, even if there is a single upstream file blah.go that has certain sections that only apply to a particular type of computing platform (e.g., in the GO programming language this is accomplished with GOOS=PLAT sections, in the C programming language this is accomplished with #IFDEF, and the like), if changes are made to the single upstream file blah.go, then it is important that the platform-specific sections of the downstream file do not miss receiving the appropriate changes corresponding to the bug fix.

As a result, the developer needs to analyze two things: 1) the changes that platform-specific downstream files copy from upstream files; and 2) that a change may need to apply to a platform-specific section in a single downstream file. It should be noted that even if such upstream file changes are identified as applying to local downstream files or platform-specific sections of local downstream files that pertain to a new heterogenous computing platform, the developer may need to manipulate the changes to accommodate the new heterogenous computing platform.

In the first scenario, the developer needs to identify all platform-specific downstream files that do not exist in the upstream files of the existing parent software project and any related files to the platform-specific downstream files that do exist in the upstream files of the existing parent software project. Then, the developer needs to determine whether an update applied to the related files needs to apply to the platform-specific downstream files. However, identifying the correct related files is not an easy task. For example, assume file blah.go is a platform-specific file for a z/Operating System (OS) platform. In the upstream files corresponding to the existing parent software project, there can be files, such as, for example, file blah.go, file "blah_unix.go," file "blah_linux.go," and the like. However, some issues arise in this approach. For example, an upstream file of the existing parent software project is named, for example, file blah_unix.go, with subfiles, such as, for example, subfile blah_linux.go, subfile "blah_zos.go," and the like. The parent upstream file contains common program code, but the downstream files contain platform-specific implementation program code. Other times, file blah_unix.go may be the upstream file version of a platform-specific file, such as, for example, file blah_zos.go. Therefore, the file name, itself is not a good indication that there is a file that should be tracked.

In the second scenario, the platform-specific section of the program code is usually written in an if-else statement, where check if OS==platform, then apply platform-specific program code and the original common program code of the parent software project into the if-else statement. For example:

```
if runtime.GOOS == "zos" {
   return zosDbgTmp( )
} else {
   return gccTmp( )
}.
```

Changes released in the upstream files of the existing parent software project necessitate that the developer synchronize the developer's locally changed downstream files of the existing parent software project with the changes to the upstream files. These upstream file changes can impact various sections of the program code. As the program code includes multiple if-else statements, managing these upstream file changes becomes increasingly complex.

In the second scenario above, if the originator who is working on the upstream files of the parent software project alters the implementation in function gccTmp( ), then the developer of the downstream z/OS platform-specific files needs to ascertain whether the upstream file update for function zosDbgTmp( ) needs synchronization with function gccTmp( ). As a result, the developer should perform manual reviews of updates, which significantly decreases efficiency.

Illustrative embodiments enable a process whereby upstream file changes, when integrated from a distributed source code control system, such as, for example, Github® (a registered trademark of Github, Inc. San Francisco, California, USA) or the like, trigger a notification or alert referring a developer to the alternate file or alternate code section of the file, which allows the developer who is working on the downstream platform-specific file to investigate whether the upstream file changes apply to the target computing platform. First, illustrative embodiments utilize a difference comparison tool to perform a comparison of textual sections of program code (e.g., comparison of files or particular sections of files). Second, illustrative embodiments augment the comparison of textual sections of program code performed by the difference comparison tool by performing function call graph analysis to determine platform-specific implementation changes at the function level. Third, illustrative embodiments perform an abstract syntax tree analysis to determine platform-specific implementation changes at the statement level for a given function. Furthermore, illustrative embodiments utilize autopatch methods whereby illustrative embodiments automatically integrate program code changes made in upstream files into downstream program-specific files, with or without triggering a notification to the developer.

Illustrative embodiments insert a hash-based comment in each affected downstream platform-specific file or each platform-specific section of an affected downstream platform-specific file. The contents of the hash-based comment include, for example, name of the upstream file on which the affected downstream platform-specific file or the platform-specific section of the affected downstream platform-specific file was based on and a hash (e.g., a SHA2 hash, SHA3 hash, MD5 hash, or the like) of the contents of the upstream file from the last time the upstream file was changed, updated, or modified. After illustrative embodiments integrate the upstream file changes into an affected local downstream platform-specific file, illustrative embodiments check all downstream platform-specific files that include such a hash-based comment to determine whether the upstream file that a particular affected downstream platform-specific file was based on has changed. If illustrative embodiments determine that the upstream file has changed, then illustrative embodiments generate a notification for the developer to examine the upstream file changes to determine whether the upstream file changes need to be transcribed into that particular affected downstream platform-specific file.

More specifically, illustrative embodiments insert hash-based comments into target downstream platform-specific files, which enable illustrative embodiments to automatically track changes to upstream files that the target downstream platform-specific files may be related to. A hash-based comment contains the name of and path to the parent upstream file, along with a mathematical hash of the last modified content of the named parent upstream file. For example, downstream platform-specific file blah_zos.go is based on parent upstream file blah.go. As a result, downstream platform-specific file blah_zos.go contains a hash-based comment that includes the name of and path to parent upstream file blah.go, along with a mathematical hash of the content of parent upstream file blah.go from when parent upstream file blah.go was last changed. If the content of parent upstream file blah.go did change, then illustrative embodiments can detect the change by a change in the hash of the content. Each time the originator who is working on the parent software project commits an upstream file change to the distributed source code control system (e.g., the centralized repository), illustrative embodiments check all the hashes that exist in hash-based comments of downstream platform-specific files in the distributed source code control system against a newly generated hash of the content of a parent upstream file (e.g., blah.go) named in one or more of the hash-based comments in the distributed source code control system. If illustrative embodiments determine that the hash of the parent upstream file has changed based on comparing hashes, then illustrative embodiments send a notification to the developer indicating that the change to the parent upstream file needs to be examined for applicability to the downstream platform-specific version of the parent upstream file.

While illustrative embodiments work when illustrative embodiments insert the hash-based comments in downstream platform-specific files from the beginning of parent upstream file program code divergence, illustrative embodiments can also apply to software projects that have already been worked on for some time. The key is for illustrative embodiments to determine which upstream files may be appropriate files to track, usually based on a measure of difference from a downstream platform-specific file. Illustrative embodiments can utilize up to a defined number of hash-based comments (e.g., five), which include the name of the parent upstream file, in any given downstream platform-specific file, ordered by the degree of difference as compared to the parent upstream file. Illustrative embodiments measure the degree of difference based on the difference in names of common function, as well as the difference in the content of those common functions. Illustrative embodiments measure the difference in the content of the common functions based on the number of program code line additions and program code line subtractions identified by the difference comparison tool. Illustrative embodiments can invoke the difference comparison tool to perform the degree of difference measurements, but illustrative embodiments can also utilize a programmatic approach to perform the difference comparisons. In determining which upstream files to include in the defined number of top upstream files (e.g., five), illustrative embodiments give priority to certain upstream files named in the hash-based comments, even if the names have little or no similarity. For example, illustrative embodiments may track changes to upstream file blah_linux.go, even though the file name has nothing in common with the name of downstream file blah_zos.go, because illustrative embodiments should examine any changes to upstream file blah_linux.go to determine whether the changes may indirectly affect downstream file blah_zos.go.

Building on this degree of difference-based approach, illustrative embodiments can search through a function call graph corresponding to a platform-specific change to determine whether any function implementation has been changed in the path starting from the current program code section in the function call graph. If illustrative embodiments determine that a function platform-specific implementation has changed based on the function call graph analysis, then illustrative embodiments generate and send a notification to the developer regarding the function platform-specific implementation change.

Illustrative embodiments detect platform-specific file changes. For example, illustrative embodiments insert a hash-based comment in a downstream platform-specific file that represents the content of an upstream file that the developer based the downstream platform-specific file on. The hash-based comment contains a hash of the content of the original upstream file or the content of a particular section of the original upstream file. A newly generated hash of the upstream file would change if the content of the upstream file changes. Consequently, by illustrative embodiments comparing hashes and detecting a difference in the hashes based on the comparison, illustrative embodiments can generate a notification for the developer to check the changes in the upstream file as affecting the downstream platform-specific file the developer is working on.

The GO programming language generates the hash of the content of the upstream file using an SHA256 hashing algorithm. Illustrative embodiments locate the hash in a hash-based comment line in the z/OS downstream platform-specific file. Illustrative embodiments search for the hash-based comment line in all z/OS downstream platform-specific files and compare the recorded hash contained in the hash-based comment line of the z/OS downstream platform-specific files with the current hash of the parent upstream file generated by illustrative embodiments in real time. If illustrative embodiments determine that the hashes are different based on the comparison, then illustrative embodiments send the developer a notification to investigate the changes in the parent upstream file.

As mentioned above, illustrative embodiments can be applied retroactively to a parent software project by determining which upstream files are most similar to a given downstream platform-specific file or a given platform-specific section of a downstream file. Illustrative embodiments identify related upstream files corresponding to the parent software project for the given downstream platform-specific file. Assume illustrative embodiments are analyzing a GO programming language compiler port of the parent software project. Initially, illustrative embodiments extract all functions and constant variables from parent upstream file blah.go and downstream platform-specific file blah_zos.go. Afterward, illustrative embodiments record the number of common functions and constant variables between parent upstream file blah.go and downstream platform-specific file blah_zos.go. Then, illustrative embodiments determine the percentage of similarity in the content of the common functions between parent upstream file blah.go and downstream platform-specific file blah_zos.go. An example of an algorithm illustrative embodiments utilize for calculating the percentage of similarity is as follows:

$$\text{similarity} = \frac{\text{lines of difference}}{\max(len(func1), len(func2))},$$

where len(func) is equal to the number of lines in the function.

Illustrative embodiments utilize the difference comparison tool to obtain the lines of difference. The difference comparison tool effectively illustrates how a parent upstream file transforms into a downstream platform-specific file by indicating the added and removed lines of program code. An example of an algorithm illustrative embodiments utilize for calculating the lines of difference is as follows:

$$\text{lines of } differece = \text{abs}(a - r) + \min(a, r),$$

where a is equal to lines of added program code shown by the difference comparison tool and b is equal to lines of removed program code shown by the difference comparison tool.

Using the information obtained above, illustrative embodiments apply prioritization to the upstream files blah*.go, giving highest priority to the related files. Priority for the GO programming language is, for example: number of common functions and constant variables>percentage of similarity>file name containing "unix">file name containing "linux">file name containing "aix." Illustrative embodiments identify the correct related files using the defined number of files ("n") as the top priority files in the list, where n is a threshold number of related files. However, it should be noted that some files can have the same priority.

It should be noted that illustrative embodiments do not need to leave the hash-based comments in the downstream platform-specific files permanently. For example, illustrative embodiments can dynamically generate the hash-based comments and insert the hash-based comments in real time prior to an upstream file merge. After illustrative embodiments send the various notifications regarding the upstream file changes, illustrative embodiments can remove the hash-based comments from the downstream platform-specific files. Alternatively, illustrative embodiments can place the hash-based comments in an accessory file, which may or may not reside in the source code control system (e.g., the centralized repository). Also, it should be noted that each hash-based comment can contain sufficient path information that illustrative embodiments can dynamically identify the downstream platform-specific file and the defined number of top related upstream files. However, when the hash-based comments contain sufficient path information to identify the downstream platform-specific file and the defined number of top related upstream files, the hash-based comments are not really comments, but just lines in a side-file.

Illustrative embodiments track functions as well. For example, sometimes it is desirable for illustrative embodiments to extend upstream file change checking to include changes to specific functions that are called from program code segments. For example, consider function "someFunc," which has a platform-specific specifier, within which two function call paths are enumerated as shown below:

```
func someFunc(a int, b int) int
{
  if runtime.GOOS == "zos" {
    return zosFunc(a, b)
  } else {
    return linuxFunc(a, b)
  }
}
func linuxFunc(a int, b int) int {
  // ... other operation
  c := linuxInnerFunc(a, b)
  // ... other operation
  return c
}
func linuxInnerFunc(a int, b int) int {
  return a + b
}.
```

In the example shown above, one function call path is for a z/OS platform and the other function call path is for a Linux platform. If there is a change to the called function "linuxFunc," or to the inner function "linuxInnerFunc," which linuxFunc calls, then illustrative embodiments notify the developer of this change, as this change may precipitate a change to the function "zosFunc" that is called in the "if" program code path.

More precisely, in function someFunc, the program code checks the current platform the program code is running on and calls the relevant function accordingly. Specifically, if the program code is running on a linux platform, then the program code calls at least two linux platform-specific functions in the example above (i.e., linuxFunc and linuxInnerFunc). Changes may occur to these two linux platform-specific functions in the parent upstream file. As a result, illustrative embodiments solely comparing textual content or abstract syntax trees within the if-else statement program code block is insufficient. To enhance upstream file change monitoring, illustrative embodiments track the functions and verify any changes in the platform-specific implementation of the functions within a function call graph, prompting notifications for the developer.

Illustrative embodiments scan the entire parent software project program code before pulling an update from the upstream file and then generate a first function call graph C1.

In addition, illustrative embodiments again scan the entire parent software project program code after pulling the update from the upstream file and then generate a second function call graph C2. After generating function call graphs C1 and C2, illustrative embodiments utilize the following algorithm:

```
For every else system check code block cb:
  functionCalls = getAllFunction(cb)
  for every functionCalls f:
    for f != null:
      if not isSameImplement(f, c1, c2):
        notify( )
        return
      else:
          f = next(f, c2)
          f2 = next(f, c1)
          if f != f2 :
            notify( )
            return.
```

For each else system check code block that invokes function calls, illustrative embodiments explore the subgraph starting from those functions in both first function call graph C1 and second function call graph C2. If illustrative embodiments determine that the subgraphs of first function call graph C1 and second function call graph C2 differ, then illustrative embodiments notify the developer regarding the change. Conversely, if illustrative embodiments determine that the subgraphs of first function call graph C1 and second function call graph C2 are identical, then illustrative embodiments inspect the platform-specific implementation of those functions within the subgraph. If any node corresponding to a particular function within the subgraph shows a differing platform-specific implementation, then illustrative embodiments notify the developer regarding the change.

An efficient way to access platform-specific implementations of functions, while illustrative embodiments scan the entire parent software project program code, is for illustrative embodiments to also build an abstract syntax tree for the functions in the parent software project. The abstract syntax tree represents the structure of the program code in the parent software project. Illustrative embodiments store the functions in a data structure, such as, for example:

functionMap:=make(map [string]ast.Node)

functionMap["filePath:someFunc" ]=AST of someFunc functionMap["filePath:someFunc2" ]=AST of someFunc2.

With illustrative embodiments building the data structure at the beginning, "isSameImplement" can be the following:

isSameImplement(f, c1, c2):

tree1=c1.functionMap[f]

tree2=c2.functionMap[f]

return compareTree(tree1, tree2).

In real-world scenarios, a function can call numerous other functions, resulting in a vast and intricate function call graph. Monitoring this entire function call graph is inefficient due to its extensive layers. Moreover, updates to a commonly used function can cause illustrative embodiments to generate numerous notifications as the commonly used function may be invoked in various paths across the entire function call graph. As a result, illustrative embodiments limit the deepness of the traversal of the entire function call graph. For example, instead of illustrative embodiments traversing an entire path in the entire function call graph, illustrative embodiments utilize a maximum traversal threshold on the path length that illustrative embodiments will traverse within the entire function call graph.

Alternatively, illustrative embodiments can terminate path traversal on a common function call. For example, if a particular function is frequently referenced, then illustrative embodiments categorize that particular function as a common function. For instance, in the GO programming language the function "println( )" can be invoked by numerous other functions. By illustrative embodiments ignoring these commonly referenced functions during function call checks, illustrative embodiments significantly enhance efficiency and reduce irrelevant notifications. For example, illustrative embodiments can set a maximum function reference threshold at, for example, 2. If illustrative embodiments determine that a node corresponding to a particular function in the function call graph has a number of incoming edges greater than or equal to the set maximum function reference threshold (e.g., 2), then illustrative embodiments ignore or skip that node corresponding to that particular function, which illustrative embodiments categorize as a common function.

Further, illustrative embodiments can generate a function call graph using program code coverage tools. For example, illustrative embodiments can further refine generating a function call graph by considering the software project's test cases and applying a program code coverage tool to generate a sequence of functions in a function call graph associated with the test cases. In this way, illustrative embodiments can generate a mapping of test cases to a function call graph as follows:

Test Case Name, Function Call Graph

Test Case 1|Main, Foo, Goo, Boo

Test Case 2|Main, Foo, Goo, Groo, Boo.

Additionally, illustrative embodiments can merge all function call graphs to generate a comprehensive function call graph representing all test cases, which represents a realistic function call graph fine-tuned to the test case coverage. Furthermore, illustrative embodiments can utilize the test case to function call graph mapping to enhance notifications corresponding to functions to also suggest the test cases to run based on the generated comprehensive function call graph above.

Moreover, illustrative embodiments can utilize abstract syntax trees to locate similar program code. In other words, illustrative embodiments can consider program code of the software project at a more granular level. For example, illustrative embodiments can consider program code differences that occur at a statement level. Illustrative embodiments utilize abstract syntax trees that represent program code statements for a given function in order to identify newly added, modified, or deleted program code. As a result, illustrative embodiments can utilize this identified information to provide a more granular notification at the statement level, instead of at the function level.

Assume the following:

```
D=2
if defined(_MVS_)
  A=5
elif defined(_linux_)
  A=6.
```

Now assume new program code was added to the else linux path:

```
D=2
if defined(_MVS_)
  A=5
elif defined(_linux_)
  A=6
  A=A*D/New Program Code.
```

Illustrative embodiments identify functions of interest by generating a list of differing functions based on comparing function call graphs (e.g., comparing function call graphs C1 and C2) as described above. Then, illustrative embodiments utilize abstract syntax trees, along with tree-based algorithms such as tree edit distance, to detect similar program code sequences across an abstract syntax tree between two functions (e.g., function Fa, which is a platform-specific function implementation in a fork corresponding to a heterogeneous platform, and function Fb, which is a base function of a base platform). In addition, illustrative embodiments can use the abstract syntax trees to detect new program code that may need adjustment to the function Fa. It should be noted that abstract syntax tree parsers exist for most programming languages. The GO programing language provides an abstract syntax tree module "go/ast," which illustrative embodiments can use to generate and analyze an abstract syntax tree for programs written in the GO programming language. Clang also provides plugin capabilities for analyzing abstract syntax trees for C and C++ programs.

First, illustrative embodiments identify newly added program code as subtrees. For example, illustrative embodiments generate a first abstract syntax tree A1 for base function Fb prior to illustrative embodiments retrieving new changes from the source code control system (e.g., before illustrative embodiments perform a Github pull for the new changes). In addition, illustrative embodiments generate a second abstract syntax tree A2 for base function Fb after illustrative embodiments retrieve the new changes from the source code control system (e.g., after illustrative embodiments pull the new changes from the Github). After generating abstract syntax trees A1 and A2, illustrative embodiments utilize the tree edit distance algorithm to compare abstract syntax tree A2 to abstract syntax tree A1. Based on illustrative embodiments comparing abstract syntax tree A2 to abstract syntax tree A1, illustrative embodiments identify a set of newly added subtrees Nb (e.g., newly added subtree N1 to newly added subtree Nx), identify a set of deleted subtrees Db (e.g., deleted subtree D1 to deleted subtree Dx), and identify a set of updated or changed subtrees Ub (e.g., updated subtree U1 to updated subtree Ux).

Second, illustrative embodiments compare function Fa with base function Fb. For example, illustrative embodiments pull the set of changes from the upstream file corresponding to the parent software project into the fork corresponding to the heterogeneous platform (e.g., using a Github pull). Illustrative embodiments generate a third abstraction syntax tree A3 for function Fa corresponding to the heterogeneous platform after pulling the set of changes from the upstream file. Illustrative embodiments compare the second abstract syntax tree A2 for base function Fb corresponding to the base platform to the third abstraction syntax tree A3 for function Fa corresponding to the heterogeneous platform. Based on illustrative embodiments comparing the second abstract syntax tree A2 for base function Fb corresponding to the base platform to the third abstraction syntax tree A3 for function Fa corresponding to the heterogeneous platform, illustrative embodiments identify a set of newly added subtrees Nf (e.g., newly added subtree N1 to newly added subtree Nx), identify a set of deleted subtrees Df (e.g., deleted subtree D1 to deleted subtree Dx), and identify a set of updated subtrees Uf (e.g., updated subtree U1 to updated subtree Ux). For each of the identified set of newly added subtrees Nf, the identified set of deleted subtrees Df, and the identified set of updated subtrees Uf, illustrative embodiments locate the common ancestor in the second abstract syntax tree A2 for base function Fb corresponding to the base platform for the identified set of newly added subtrees Nf, the identified set of deleted subtrees Df, and the identified set of updated subtrees Uf. After illustrative embodiments identify the common ancestor for the identified set of newly added subtrees Nf, the common ancestor for the identified set of deleted subtrees Df, and the common ancestor for the identified set of updated subtrees Uf in the second abstract syntax tree A2 for base function Fb corresponding to the base platform, illustrative embodiments send a developer notification for each common ancestor.

Illustrative embodiments can automatically implement the set of changes into the downstream platform-specific file corresponding to the heterogenous platform. For example, illustrative embodiments can add the subtree in the forked path corresponding to the heterogenous platform to the abstraction syntax tree corresponding to the base platform. For example, illustrative embodiments can add the subtree corresponding to the heterogenous platform to all divergent sub-nodes in the abstraction syntax tree corresponding to the base platform. Afterward, illustrative embodiments select a particular divergent sub-node in the abstraction syntax tree corresponding to the base platform to add the subtree corresponding to the heterogenous platform based on a successful build and a highest success rate on a given set of test cases.

Thus, illustrative embodiments provide one or more technical solutions that overcome a technical problem with a current inability to know all the changes made to upstream files corresponding to a computing platform of a parent software project that need to be applied to downstream platform-specific files corresponding to heterogeneous computing platforms for porting. As a result, these one or more technical solutions provide a technical effect and practical application in the field of porting software.

Figure 2:
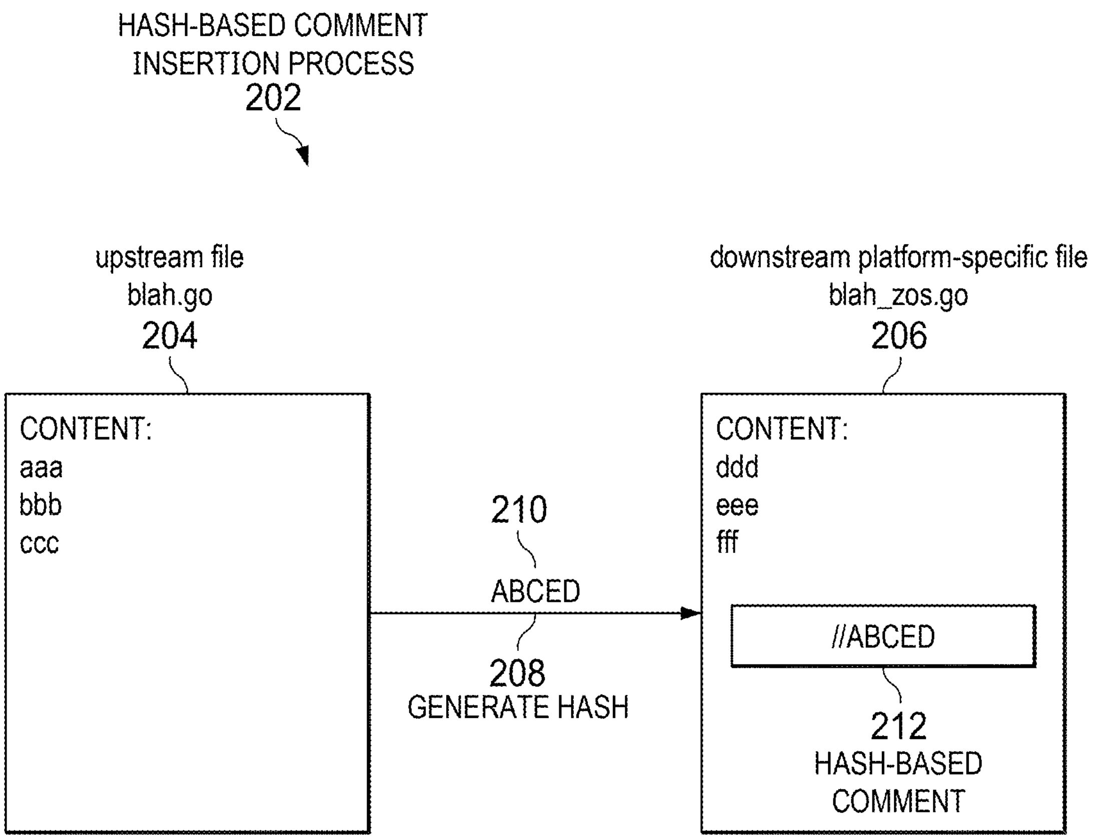
FIG. 2 is a diagram illustrating an example of a hash-based comment insertion process in accordance with an illustrative embodiment.

With reference now to FIG. 2, a diagram illustrating an example of a hash-based comment insertion process is depicted in accordance with an illustrative embodiment. Hash-based comment insertion process 202 is implemented in a computer, such as computer 101 in FIG. 1.

In this example, hash-based comment insertion process 202 includes upstream file blah.go 204 and downstream platform-specific file blah_zos.go 206. However, it should be noted that hash-based comment insertion process 202 is intended as an example only and not as a limitation on illustrative embodiments. For example, hash-based comment insertion process 202 can include any number and type of upstream files and downstream platform-specific files.

At 208, in response to hash-based comment insertion process 202 determining that downstream platform-specific file blah_zos.go 206 is related to upstream file blah.go 204 based on, for example, number of functions and constant variables in common, degree of similarity, file names, and the like, hash-based comment insertion process 202 generates a hash of the content of upstream file blah.go 204 using a hashing algorithm. In this example, the hash of the content of upstream file blah.go 204 is hash "ABCED" 210. In addition, hash-based comment insertion process 202 inserts hash-based comment 212 in downstream platform-specific file blah_zos.go 206. Further, hash-based comment insertion process 202 places hash ABCED 210, which is the hash of the content of upstream file blah.go 204, in hash-based comment 212. Hash-based comment insertion process 202 can also include other information in hash-based comment 212, such as, for example, name of upstream file blah.go 204, path to upstream file blah.go 204, and the like.

Figure 3:
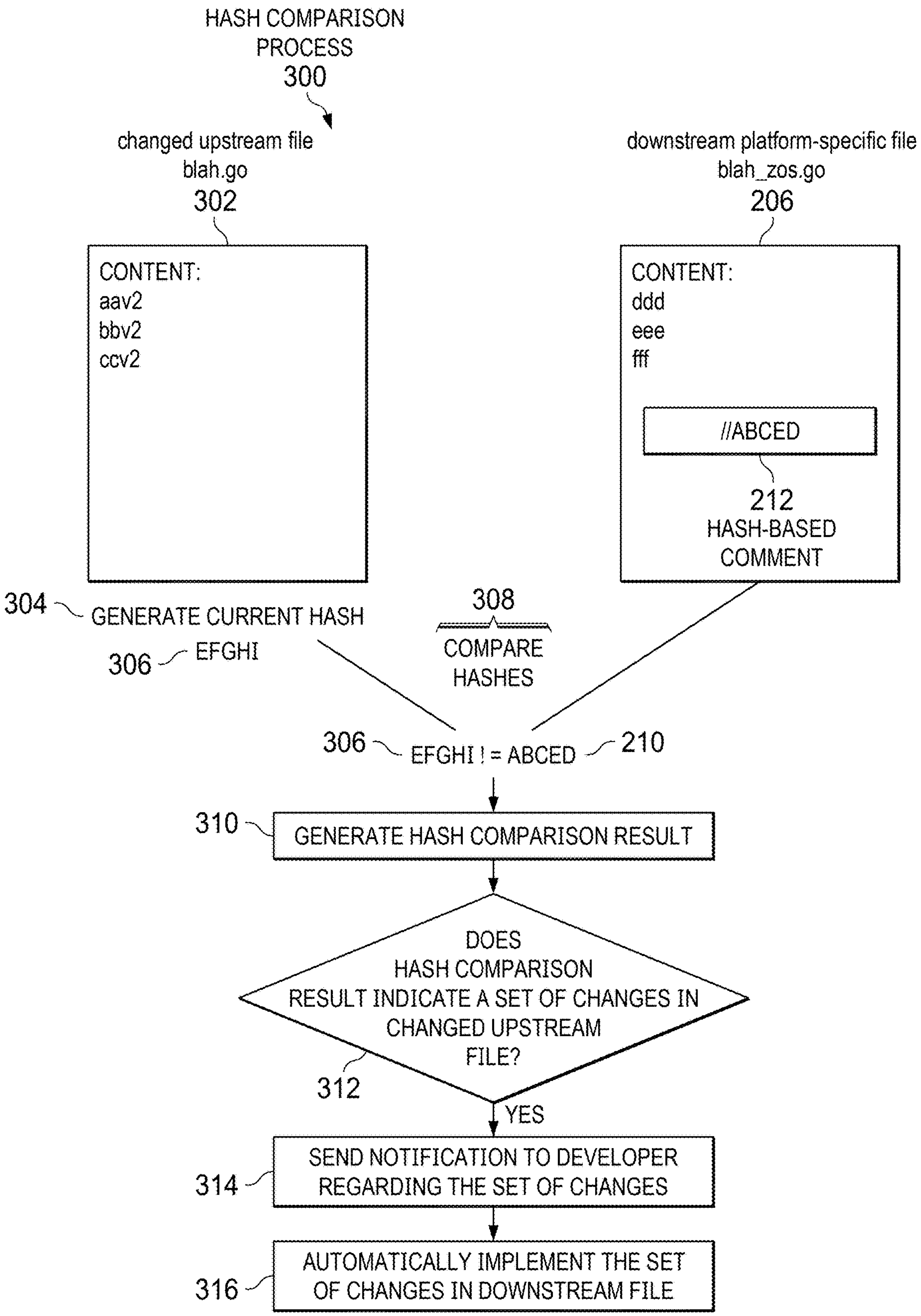
FIG. 3 is a diagram illustrating an example of a hash comparison process in accordance with an illustrative embodiment.

With reference now to FIG. 3, a diagram illustrating an example of a hash comparison process is depicted in accordance with an illustrative embodiment. Hash comparison process 300 is implemented in a computer, such as computer 101 in FIG. 1.

In this example, hash comparison process 300 includes changed upstream file blah.go 302 and downstream platform-specific file blah_zos.go 206. It should be noted that changed upstream file blah.go 302 is an updated or modified version of upstream file blah.go 204 in FIG. 2 after a set of changes has been made.

At 304, in response to hash comparison process 300 detecting the set of changes in changed upstream file blah.go 302, hash comparison process 300 generates a current hash of the content of changed upstream file blah.go 302 in real time. In this example, the current hash of the content of changed upstream file blah.go 302 is current hash "EFGHI" 306. In addition, hash comparison process 300 retrieves hash ABCED 210, which is the previously generated hash of the content of upstream file blah.go 204 in FIG. 2, from hash-based comment 212 in downstream platform-specific file blah_zos.go 206.

At 308, hash comparison process 300 compares current hash EFGHI 306 to hash ABCED 210. At 310, based on the comparison of current hash EFGHI 306 to hash ABCED 210, hash comparison process 300 generates a hash comparison result. At 312, hash comparison process 300 determines whether the hash comparison result indicates a set of changes in changed upstream file blah.go 302, which in this example the answer is yes because current hash EFGHI 306 does not match hash ABCED 210.

At 314, in response to hash comparison process 300 determining that the hash comparison result does indicate a set of changes in changed upstream file blah.go 302, hash comparison process 300 sends a notification to a developer of downstream platform-specific file blah_zos.go 206 regarding the set of changes. Furthermore, at 316, hash comparison process 300 automatically implements the set of changes downstream platform-specific file blah_zos.go 206.

Figure 4:
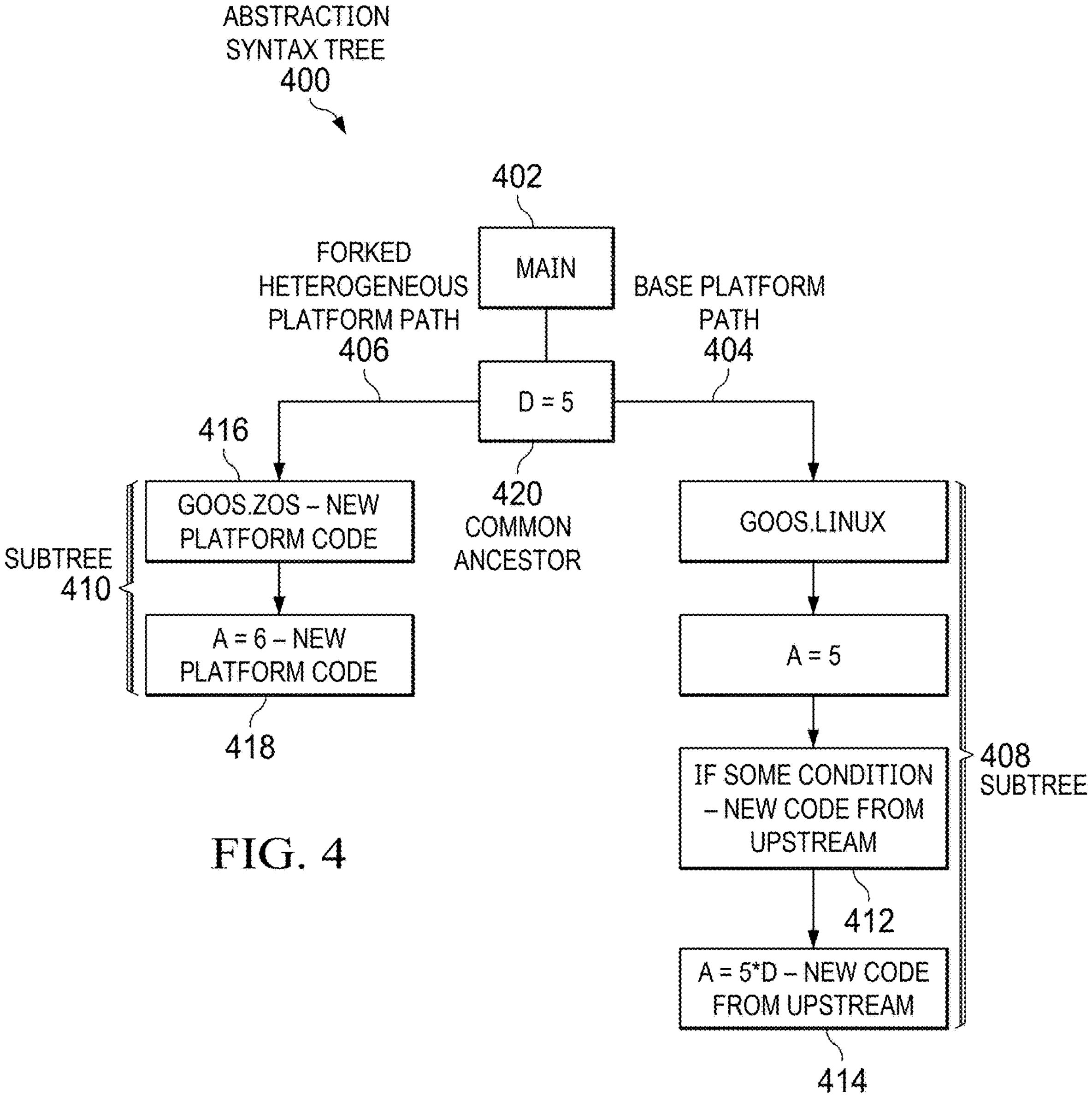
FIG. 4 is a diagram illustrating an example of an abstraction syntax tree in accordance with an illustrative embodiment.

With reference now to FIG. 4, a diagram illustrating an example of an abstraction syntax tree is depicted in accordance with an illustrative embodiment. Abstraction syntax tree 400 is implemented in a computer, such as computer 101 in FIG. 1.

In this example, abstraction syntax tree 400 includes main path 402, base platform path 404, and forked heterogeneous platform path 406. Base platform path 404 includes subtree 408 and forked heterogeneous platform path 406 includes subtree 410. However, it should be noted that abstraction syntax tree 400 is intended as a simplified example and can include any number of subtrees.

The computer utilizes, for example, a tree edit distance algorithm to detect the two newly added subtrees (i.e., subtree 408 and subtree 410), one corresponding to base platform path 404 and one corresponding to forked heterogeneous platform path 406. Subtree 408 include new code 412 and new code 414. Subtree 410 includes new platform code 416 and new platform code 418.

The computer can annotate the nodes of abstraction syntax tree 400 with a label to make each node uniquely identifiable. The computer traverses up both subtree 408 and subtree 410 to a identify where the subtrees collide. The computer identifies the point of subtree collision as common ancestor 420, which in this example is D=5. Common ancestor 420 is where the computer adds a notification to the developer of the downstream platform-specific file corresponding to forked heterogeneous platform path 406.

Figure 5A:
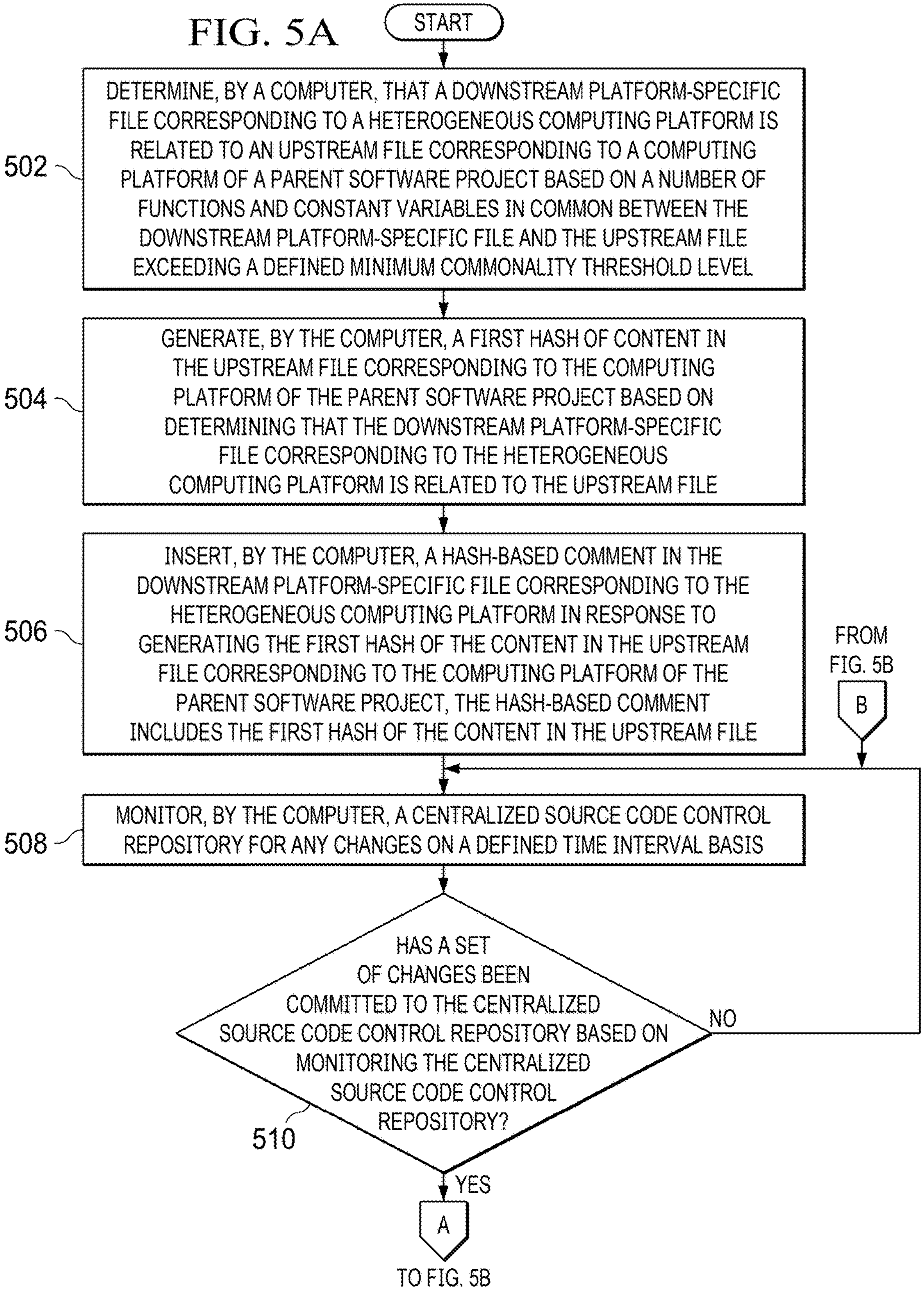
FIGS. 5A-5B are a flowchart illustrating a process for managing software project ports in accordance with an illustrative embodiment.
Figure 5B:
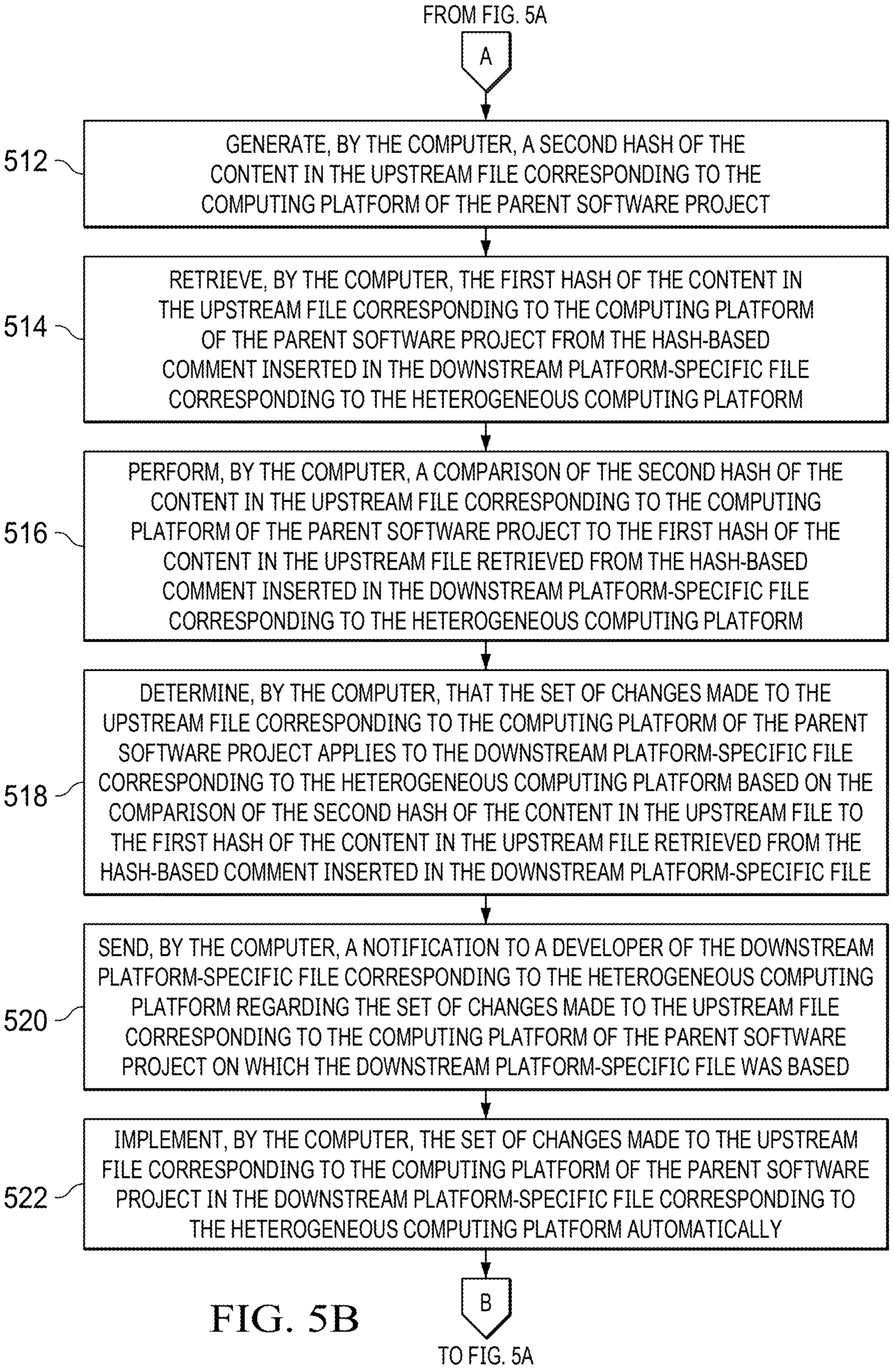

With reference now to FIGS. 5A-5B, a flowchart illustrating a process for managing software project ports is shown in accordance with an illustrative embodiment. The process shown in FIGS. 5A-5B may be implemented in a computer, such as, for example, computer 101 in FIG. 1. For example, the process shown in FIGS. 5A-5B may be implemented by software project port management code 200 in FIG. 1.

The process begins when the computer determines that a downstream platform-specific file corresponding to a heterogeneous computing platform is related to an upstream file corresponding to a computing platform of a parent software project based on a number of functions and constant variables in common between the downstream platform-specific file and the upstream file exceeding a defined minimum commonality threshold level (step 502). The computer generates a first hash of content in the upstream file corresponding to the computing platform of the parent software project based on determining that the downstream platform-specific file corresponding to the heterogeneous computing platform is related to the upstream file (step 504).

The computer inserts a hash-based comment in the downstream platform-specific file corresponding to the heterogeneous computing platform in response to generating the first hash of the content in the upstream file corresponding to the computing platform of the parent software project, the hash-based comment includes the first hash of the content in the upstream file (step 506). The computer monitors a centralized source code control repository for any changes on a defined time interval basis (step 508). The computer makes a determination as to whether a set of changes has been committed to the centralized source code control repository based on monitoring the centralized source code control repository for any changes (step 510).

If the computer determines that a set of changes has not been committed to the centralized source code control repository based on monitoring the centralized source code control repository for any changes, no output of step 510, then the process returns to step 508 where the computer continues to monitor the centralized source code control repository. If the computer determines that a set of changes has been committed to the centralized source code control repository based on monitoring the centralized source code control repository for any changes, yes output of step 510, then the computer generates a second hash of the content in the upstream file corresponding to the computing platform of the parent software project (step 512). In addition, the computer retrieves the first hash of the content in the upstream file corresponding to the computing platform of the parent software project from the hash-based comment inserted in the downstream platform-specific file corresponding to the heterogeneous computing platform (step 514). The computer performs a comparison of the second hash of the content in the upstream file corresponding to the computing platform of the parent software project to the first hash of the content in the upstream file retrieved from the hash-based comment inserted in the downstream platform-specific file corresponding to the heterogeneous computing platform (step 516).

It should be noted that the computer knows which of the downstream platform-specific files corresponding to heterogeneous computing platforms have hash-based comments inserted in them. As a result, the computer can quickly check for the hash-based comments. Alternatively, the computer can maintain a list of downstream platform-specific files having hash-based comments inserted in them. Each hash-based comment includes a file path to the corresponding upstream file. The computer knows when a change has been made in one or more upstream files because the computer monitors or periodically checks the centralized source code control repository for any changes at a gross level. For each of the downstream platform-specific files that includes a hash-based comment, the computer generates a hash of the corresponding upstream file named in the hash-based comment to compare hashes.

Also, it should be noted that the computer first merges in all the upstream files changes into the downstream platform-specific version and then checks the files post-merge. Consequently, the upstream files the computer compares against have been copied down into the local source code control repository. In other words, when the computer identifies an upstream file to hash in order to compare with the hash stored in a hash-based comment, that upstream file has been copied locally. Thus, the process is efficient by being able to quickly run through all the hash-based comments, quickly locate the named upstream file locally, generate a new hash of the named upstream file, and then compare the hashes.

The computer determines that the set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file (step 518). The computer sends a notification to a developer of the downstream platform-specific file corresponding to the heterogeneous computing platform regarding the set of changes made to the upstream file corresponding to the computing platform of the parent software project on which the downstream platform-specific file was based (step 520). Further, the computer implements the set of changes made to the upstream file corresponding to the computing platform of the parent software project in the downstream platform-specific file corresponding to the heterogeneous computing platform automatically (step 522). Thereafter, the process returns to step 508 where the computer continues to monitor the centralized source code control repository for any changes.

Figure 6A:
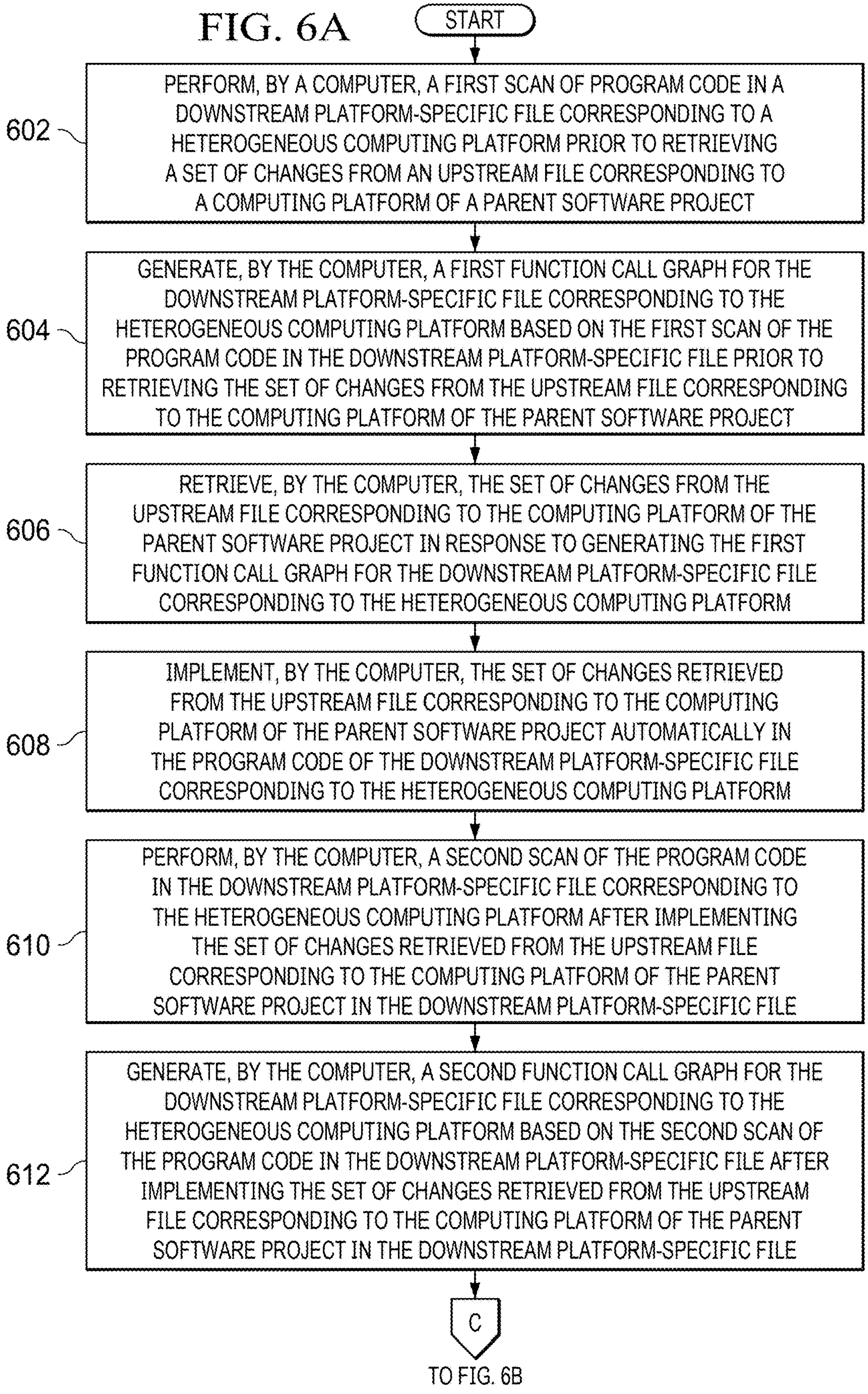
FIGS. 6A-6C are a flowchart illustrating a process for performing a function call graph analysis to determine platform-specific implementation changes at the function level in accordance with an illustrative embodiment.
Figure 6B:
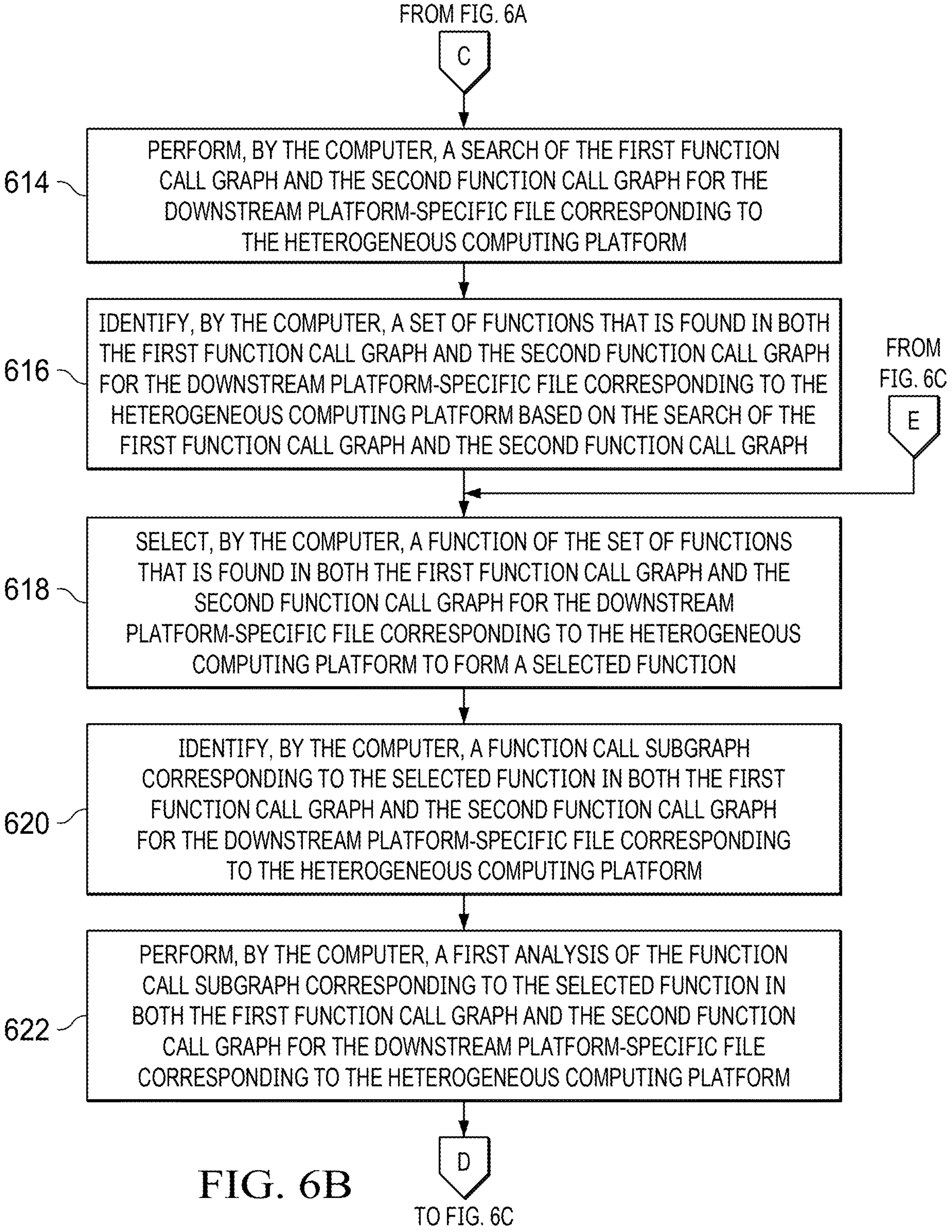
Figure 6C:
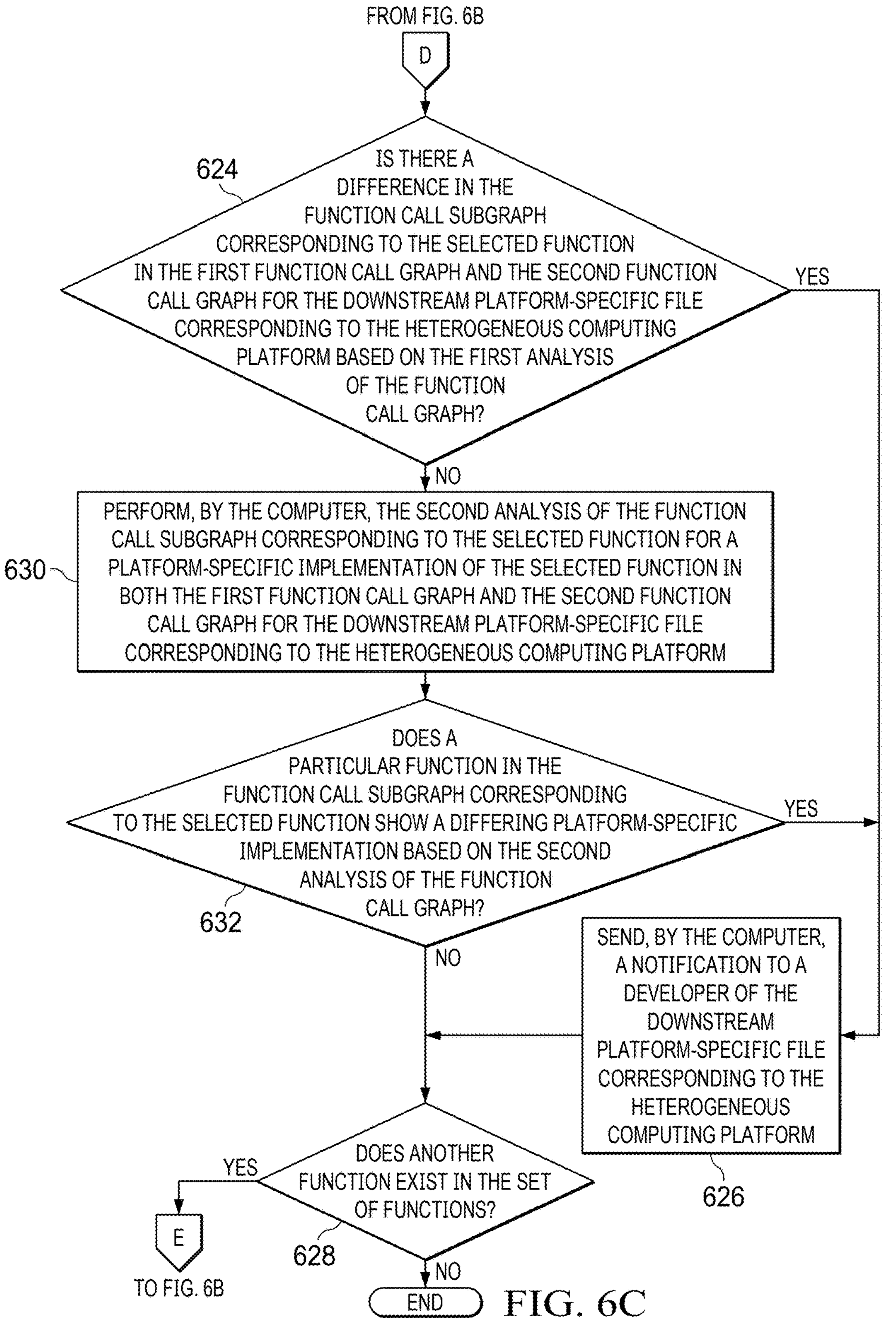

With reference now to FIGS. 6A-6C, a flowchart illustrating a process for performing a function call graph analysis to determine platform-specific implementation changes at the function level is shown in accordance with an illustrative embodiment. The process shown in FIGS. 6A-6C may be implemented in a computer, such as, for example, computer 101 in FIG. 1. For example, the process shown in FIGS. 6A-6C may be implemented by software project port management code 200 in FIG. 1.

The process begins when the computer performs a first scan of program code in a downstream platform-specific file corresponding to a heterogeneous computing platform prior to retrieving a set of changes from an upstream file corresponding to a computing platform of a parent software project (step 602). The computer generates a first function call graph for the downstream platform-specific file corresponding to the heterogeneous computing platform based on the first scan of the program code in the downstream platform-specific file prior to retrieving the set of changes from the upstream file corresponding to the computing platform of the parent software project (step 604).

The computer retrieves the set of changes from the upstream file corresponding to the computing platform of the parent software project in response to generating the first function call graph for the downstream platform-specific file corresponding to the heterogeneous computing platform (step 606). The computer implements the set of changes retrieved from the upstream file corresponding to the computing platform of the parent software project automatically in the program code of the downstream platform-specific file corresponding to the heterogeneous computing platform (step 608).

The computer performs a second scan of the program code in the downstream platform-specific file corresponding to the heterogeneous computing platform after implementing the set of changes retrieved from the upstream file corresponding to the computing platform of the parent software project in the downstream platform-specific file (step 610). The computer generates a second function call graph for the downstream platform-specific file corresponding to the heterogeneous computing platform based on the second scan of the program code in the downstream platform-specific file after implementing the set of changes retrieved from the upstream file corresponding to the computing platform of the parent software project in the downstream platform-specific file (step 612).

The computer performs a search of the first function call graph and the second function call graph for the downstream platform-specific file corresponding to the heterogeneous computing platform (step 614). The computer identifies a set of functions that is found in both the first function call graph and the second function call graph for the downstream platform-specific file corresponding to the heterogeneous computing platform based on the search of the first function call graph and the second function call graph (step 616).

The computer selects a function of the set of functions that is found in both the first function call graph and the second function call graph for the downstream platform-specific file corresponding to the heterogeneous computing platform to form a selected function (step 618). The computer identifies a function call subgraph corresponding to the selected function in both the first function call graph and the second function call graph for the downstream platform-specific file corresponding to the heterogeneous computing platform (step 620).

The computer performs a first analysis of the function call subgraph corresponding to the selected function in both the first function call graph and the second function call graph for the downstream platform-specific file corresponding to the heterogeneous computing platform (step 622). The computer makes a determination as to whether there is a difference in the function call subgraph corresponding to the selected function in the first function call graph and the second function call graph for the downstream platform-specific file corresponding to the heterogeneous computing platform based on the first analysis of the function call graph (step 624).

If the computer determines that there is a difference in the function call subgraph corresponding to the selected function in the first function call graph and the second function call graph for the downstream platform-specific file corresponding to the heterogeneous computing platform based on the first analysis of the function call graph, yes output of step 624, then the computer sends a notification to a developer of the downstream platform-specific file corresponding to the heterogeneous computing platform regarding the difference in the function call subgraph (step 626). Afterward, the computer makes a determination as to whether another function exists in the set of functions (step 628).

If the computer determines that another function does exist in the set of functions, yes output of step 628, then the process returns to step 618 where the computer selects another function from the set of functions. If the computer determines that another function does not exist in the set of functions, no output of step 628, then the process terminates thereafter.

Returning again to step 624, if the computer determines that there is no difference in the function call subgraph corresponding to the selected function in the first function call graph and the second function call graph for the downstream platform-specific file corresponding to the heterogeneous computing platform based on the first analysis of the function call graph, no output of step 624, then the computer performs a second analysis of the function call subgraph corresponding to the selected function for a platform-specific implementation of the selected function in both the first function call graph and the second function call graph for the downstream platform-specific file corresponding to the heterogeneous computing platform (step 630). Afterward, the computer makes a determination as to whether a particular function in the function call subgraph corresponding to the selected function shows a differing platform-specific implementation based on the second analysis of the function call graph (step 632).

If the computer determines that a particular function in the function call subgraph corresponding to the selected function does show a differing platform-specific implementation based on the second analysis of the function call graph, yes output of step 632, then the process returns to step 626 where the computer sends a notification to the developer of the downstream platform-specific file corresponding to the heterogeneous computing platform regarding the particular function showing a differing platform-specific implementation. If the computer determines that a particular function in the function call subgraph corresponding to the selected function does not show a differing platform-specific implementation based on the second analysis of the function call graph, no output of step 632, then the process returns to step 628 where the computer determines whether another function exists in the set of functions.

Figure 7A:
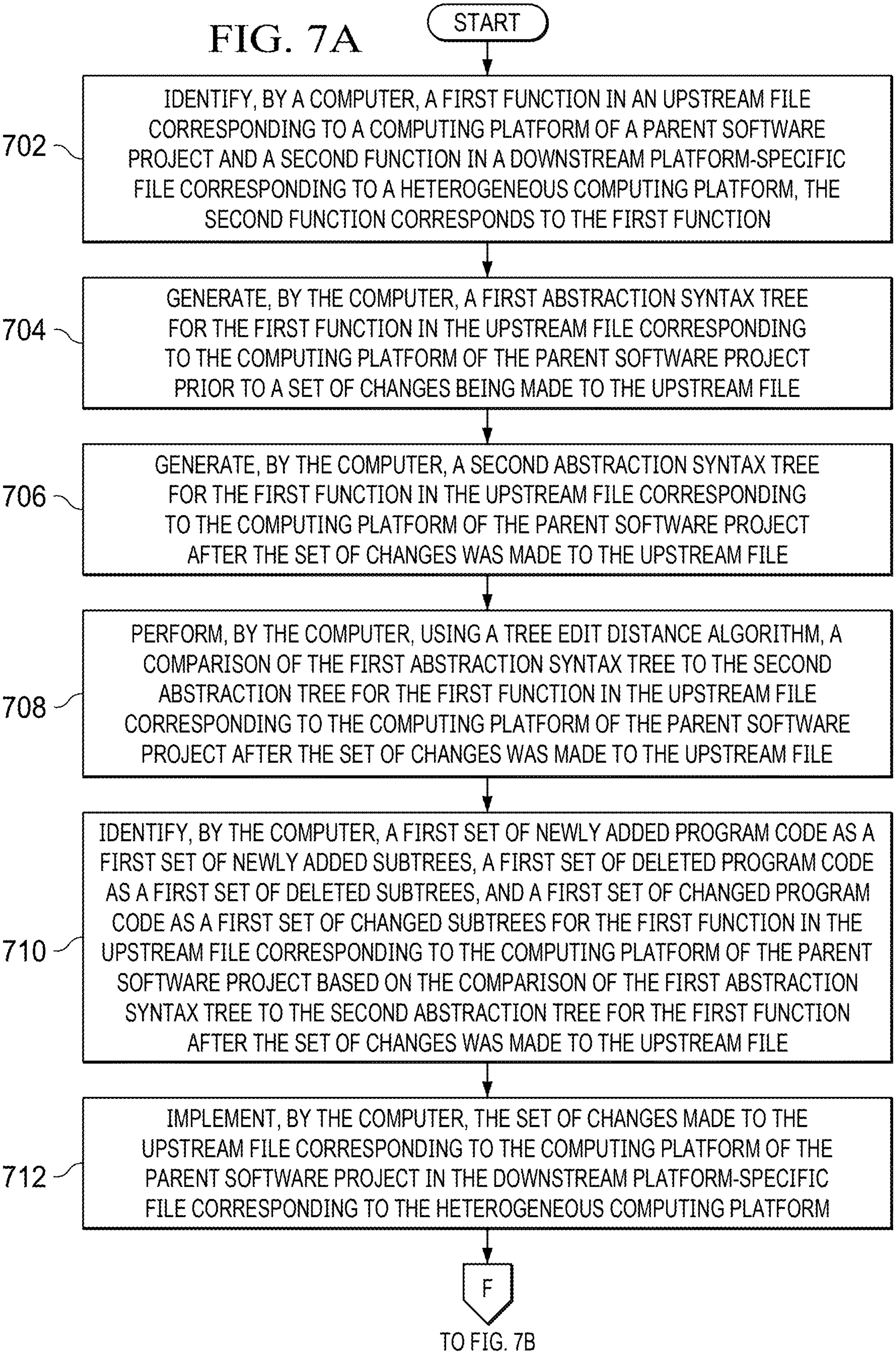
FIGS. 7A-7C are a flowchart illustrating a process for performing an abstract syntax tree analysis to determine platform-specific implementation changes at the statement level for a given function in accordance with an illustrative embodiment.
Figure 7B:
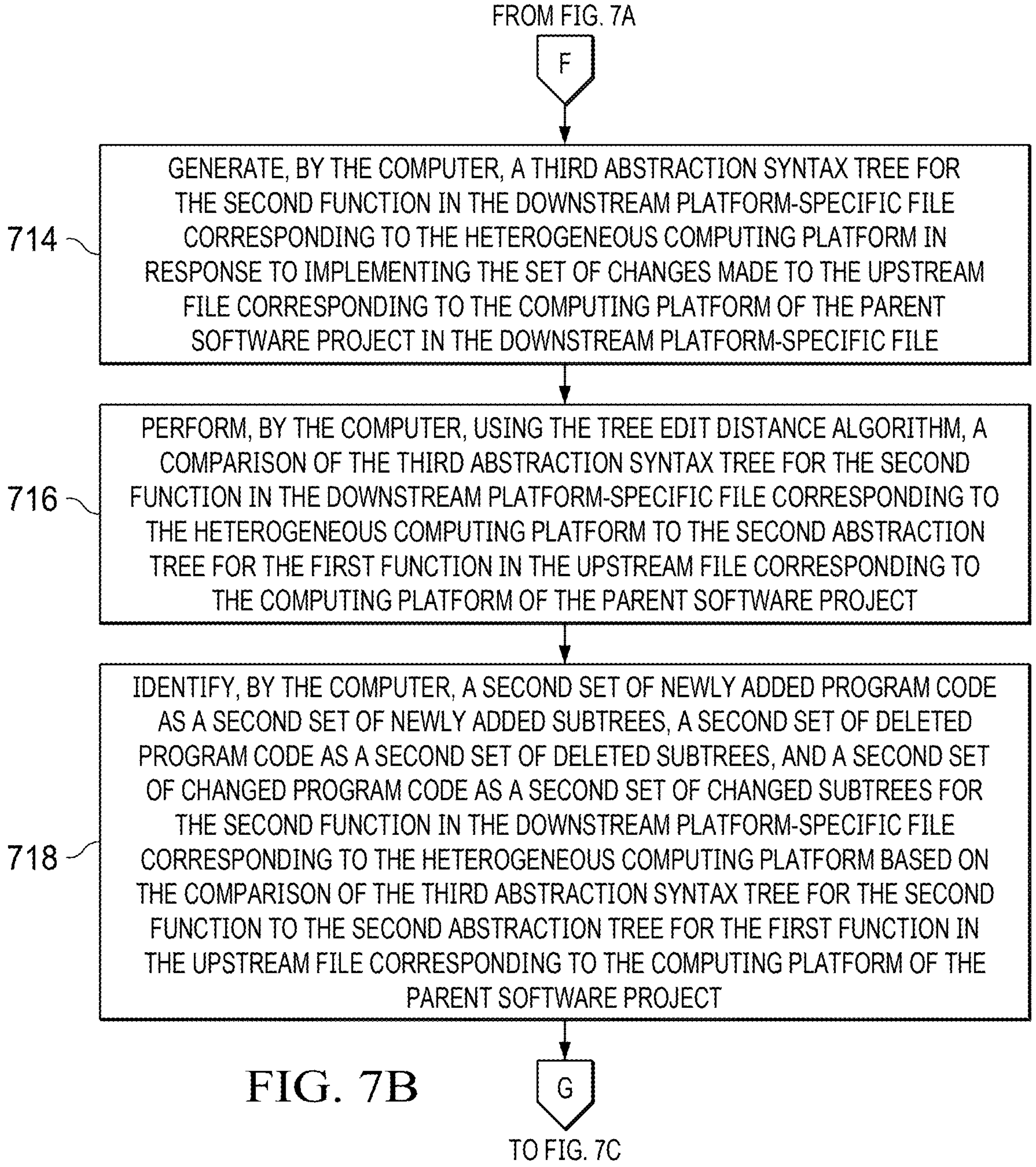
Figure 7C:
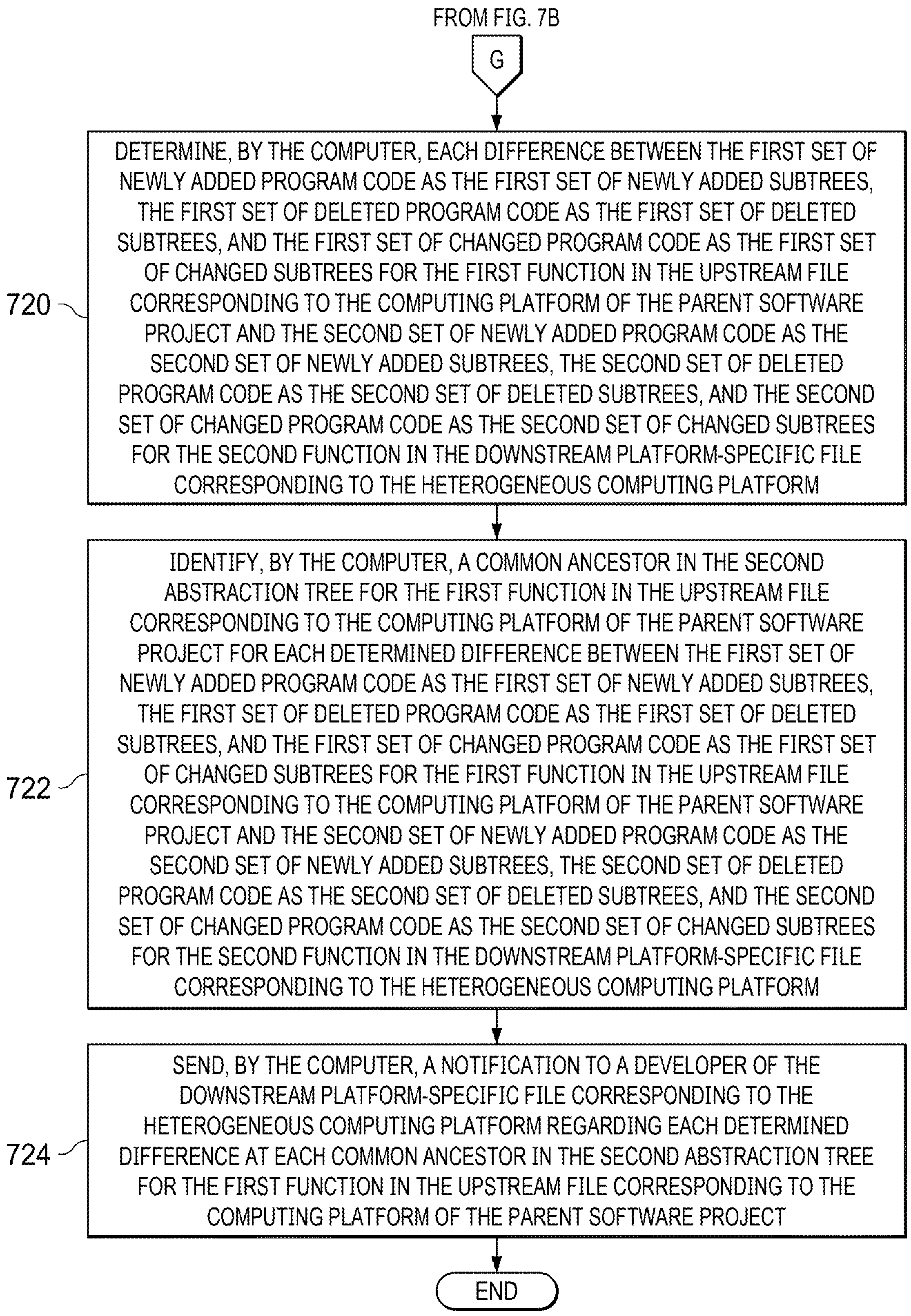

With reference now to FIGS. 7A-7C, a flowchart illustrating a process for performing an abstract syntax tree analysis to determine platform-specific implementation changes at the statement level for a given function is shown in accordance with an illustrative embodiment. The process shown in FIGS. 7A-7C may be implemented in a computer, such as, for example, computer 101 in FIG. 1. For example, the process shown in FIGS. 7A-7C may be implemented by software project port management code 200 in FIG. 1.

The process begins when the computer identifies a first function in an upstream file corresponding to a computing platform of a parent software project and a second function in a downstream platform-specific file corresponding to a heterogeneous computing platform (step 702). The second function corresponds to the first function. The computer generates a first abstraction syntax tree for the first function in the upstream file corresponding to the computing platform of the parent software project prior to a set of changes being made to the upstream file (step 704). The computer generates a second abstraction syntax tree for the first function in the upstream file corresponding to the computing platform of the parent software project after the set of changes was made to the upstream file (step 706).

The computer, using a tree edit distance algorithm, performs a comparison of the first abstraction syntax tree to the second abstraction tree for the first function in the upstream file corresponding to the computing platform of the parent software project after the set of changes was made to the upstream file (step 708). The computer identifies a first set of newly added program code as a first set of newly added subtrees, a first set of deleted program code as a first set of deleted subtrees, and a first set of changed program code as a first set of changed subtrees for the first function in the upstream file corresponding to the computing platform of the parent software project based on the comparison of the first abstraction syntax tree to the second abstraction tree for the first function after the set of changes was made to the upstream file (step 710).

The computer implements the set of changes made to the upstream file corresponding to the computing platform of the parent software project in the downstream platform-specific file corresponding to the heterogeneous computing platform (step 712). The computer generates a third abstraction syntax tree for the second function in the downstream platform-specific file corresponding to the heterogeneous computing platform in response to implementing the set of changes made to the upstream file corresponding to the computing platform of the parent software project in the downstream platform-specific file (step 714).

The computer, using the tree edit distance algorithm, performs a comparison of the third abstraction syntax tree for the second function in the downstream platform-specific file corresponding to the heterogeneous computing platform to the second abstraction tree for the first function in the upstream file corresponding to the computing platform of the parent software project (step 716). The computer identifies a second set of newly added program code as a second set of newly added subtrees, a second set of deleted program code as a second set of deleted subtrees, and a second set of changed program code as a second set of changed sub trees for the second function in the downstream platform-specific file corresponding to the heterogeneous computing platform based on the comparison of the third abstraction syntax tree for the second function to the second abstraction tree for the first function in the upstream file corresponding to the computing platform of the parent software project (step 718).

The computer determines each difference between the first set of newly added program code as the first set of newly added subtrees, the first set of deleted program code as the first set of deleted subtrees, and the first set of changed program code as the first set of changed subtrees for the first function in the upstream file corresponding to the computing platform of the parent software project and the second set of newly added program code as the second set of newly added subtrees, the second set of deleted program code as the second set of deleted subtrees, and the second set of changed program code as the second set of changed sub trees for the second function in the downstream platform-specific file corresponding to the heterogeneous computing platform (step 720). The computer identifies a common ancestor in the second abstraction tree for the first function in the upstream file corresponding to the computing platform of the parent software project for each determined difference between the first set of newly added program code as the first set of newly added subtrees, the first set of deleted program code as the first set of deleted subtrees, and the first set of changed program code as the first set of changed subtrees for the first function in the upstream file corresponding to the computing platform of the parent software project and the second set of newly added program code as the second set of newly added subtrees, the second set of deleted program code as the second set of deleted subtrees, and the second set of changed program code as the second set of changed sub trees for the second function in the downstream platform-specific file corresponding to the heterogeneous computing platform (step 722). The computer sends a notification to a developer of the downstream platform-specific file corresponding to the heterogeneous computing platform regarding each determined difference at each common ancestor in the second abstraction tree for the first function in the upstream file corresponding to the computing platform of the parent software project (step 724). Thereafter, the process terminates.

Thus, illustrative embodiments of the present disclosure provide a computer-implemented method, computer system, and computer program product for managing software project ports. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing software project ports, the computer-implemented method comprising:

determining, by a computer, that a downstream platform-specific file corresponding to a heterogeneous computing platform is related to an upstream file corresponding to a computing platform of a parent software project based on a number of functions and constant variables in common between the downstream platform-specific file and the upstream file exceeding a defined minimum commonality threshold level;

generating, by the computer, using a hashing algorithm, a first hash of content in the upstream file corresponding to the computing platform of the parent software project based on determining that the downstream platform-specific file corresponding to the heterogeneous computing platform is related to the upstream file;

inserting, by the computer, a hash-based comment in the downstream platform-specific file corresponding to the heterogeneous computing platform in response to generating the first hash of the content in the upstream file corresponding to the computing platform of the parent software project, the hash-based comment includes the first hash of the content in the upstream file;

generating, by the computer, using the hashing algorithm, a second hash of the content in the upstream file corresponding to the computing platform of the parent software project in response to determining that a set of changes has been committed to a centralized source code control repository based on monitoring the centralized source code control repository for any changes;

retrieving, by the computer, the first hash of the content in the upstream file corresponding to the computing platform of the parent software project from the hash-based comment inserted in the downstream platform-specific file corresponding to the heterogeneous computing platform;

performing, by the computer, a comparison of the second hash of the content in the upstream file corresponding to the computing platform of the parent software project to the first hash of the content in the upstream file retrieved from the hash-based comment inserted in the downstream platform-specific file corresponding to the heterogeneous computing platform;

determining, by the computer, that the set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file; and implementing, by the computer, the set of changes made to the upstream file corresponding to the computing platform of the parent software project in the downstream platform-specific file corresponding to the heterogeneous computing platform automatically.

2. The computer-implemented method of claim 1, further comprising:

monitoring, by the computer, the centralized source code control repository for any changes; and determining, by the computer, whether the set of changes has been committed to the centralized source code control repository based on monitoring the centralized source code control repository for any changes.

3. The computer-implemented method of claim 1, further comprising:

sending, by the computer, a notification to a developer of the downstream platform-specific file corresponding to the heterogeneous computing platform regarding the set of changes made to the upstream file corresponding to the computing platform of the parent software project on which the downstream platform-specific file was based.

4. The computer-implemented method of claim 1, further comprising:

performing, by the computer, a function call graph analysis to determine platform-specific implementation changes at a function level.

5. The computer-implemented method of claim 1, further comprising:

performing, by the computer, an abstract syntax tree analysis to determine platform-specific implementation changes at a statement level for a given function.

6. A computer system for managing software project ports, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

determine that a downstream platform-specific file corresponding to a heterogeneous computing platform is related to an upstream file corresponding to a computing platform of a parent software project based on a number of functions and constant variables in common between the downstream platform-specific file and the upstream file exceeding a defined minimum commonality threshold level;

generate, using a hashing algorithm, a first hash of content in the upstream file corresponding to the computing platform of the parent software project based on determining that the downstream platform-specific file corresponding to the heterogeneous computing platform is related to the upstream file;

insert a hash-based comment in the downstream platform-specific file corresponding to the heterogeneous computing platform in response to generating the first hash of the content in the upstream file corresponding to the computing platform of the parent software project, the hash-based comment includes the first hash of the content in the upstream file;

generate, using the hashing algorithm, a second hash of the content in the upstream file corresponding to the computing platform of the parent software project in response to determining that a set of changes has been committed to a centralized source code control repository based on monitoring the centralized source code control repository for any changes;

retrieve the first hash of the content in the upstream file corresponding to the computing platform of the parent software project from the hash-based comment inserted in the downstream platform-specific file corresponding to the heterogeneous computing platform;

perform a comparison of the second hash of the content in the upstream file corresponding to the computing platform of the parent software project to the first hash of the content in the upstream file retrieved from the hash-based comment inserted in the downstream platform-specific file corresponding to the heterogeneous computing platform;

determine that the set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file; and implement the set of changes made to the upstream file corresponding to the computing platform of the parent software project in the downstream platform-specific file corresponding to the heterogeneous computing platform automatically.

7. The computer system of claim 6, wherein the set of processors further executes the program instructions to:

monitor the centralized source code control repository for any changes; and determine whether the set of changes has been committed to the centralized source code control repository based on monitoring the centralized source code control repository for any changes.

8. The computer system of claim 6, wherein the set of processors further executes the program instructions to:

send a notification to a developer of the downstream platform-specific file corresponding to the heterogeneous computing platform regarding the set of changes made to the upstream file corresponding to the computing platform of the parent software project on which the downstream platform-specific file was based.

9. The computer system of claim 6, wherein the set of processors further executes the program instructions to:

perform a function call graph analysis to determine platform-specific implementation changes at a function level.

10. A computer program product for managing software project ports, the computer program product comprising a set of computer-readable storage media having program instructions collectively stored therein, the program instructions executable by a computer to cause the computer to:

determine that a downstream platform-specific file corresponding to a heterogeneous computing platform is related to an upstream file corresponding to a computing platform of a parent software project based on a number of functions and constant variables in common between the downstream platform-specific file and the upstream file exceeding a defined minimum commonality threshold level;

generate, using a hashing algorithm, a first hash of content in the upstream file corresponding to the computing platform of the parent software project based on determining that the downstream platform-specific file corresponding to the heterogeneous computing platform is related to the upstream file;

insert a hash-based comment in the downstream platform-specific file corresponding to the heterogeneous computing platform in response to generating the first hash of the content in the upstream file corresponding to the computing platform of the parent software project, the hash-based comment includes the first hash of the content in the upstream file;

generate, using the hashing algorithm, a second hash of the content in the upstream file corresponding to the computing platform of the parent software project in response to determining that a set of changes has been committed to a centralized source code control repository based on monitoring the centralized source code control repository for any changes;

retrieve the first hash of the content in the upstream file corresponding to the computing platform of the parent software project from the hash-based comment inserted in the downstream platform-specific file corresponding to the heterogeneous computing platform;

perform a comparison of the second hash of the content in the upstream file corresponding to the computing platform of the parent software project to the first hash of the content in the upstream file retrieved from the hash-based comment inserted in the downstream platform-specific file corresponding to the heterogeneous computing platform;

determine that the set of changes made to the upstream file corresponding to the computing platform of the parent software project applies to the downstream platform-specific file corresponding to the heterogeneous computing platform based on the comparison of the second hash of the content in the upstream file to the first hash of the content in the upstream file retrieved from the hash-based comment inserted in the downstream platform-specific file; and implement the set of changes made to the upstream file corresponding to the computing platform of the parent software project in the downstream platform-specific file corresponding to the heterogeneous computing platform automatically.

11. The computer program product of claim 10, wherein the program instructions further cause the computer to:

monitor the centralized source code control repository for any changes; and determine whether the set of changes has been committed to the centralized source code control repository based on monitoring the centralized source code control repository for any changes.

12. The computer program product of claim 10, wherein the program instructions further cause the computer to:

perform a function call graph analysis to determine platform-specific implementation changes at a function level.

13. The computer program product of claim 10, wherein the program instructions further cause the computer to:

perform an abstract syntax tree analysis to determine platform-specific implementation changes at a statement level for a given function.

14. The computer program product of claim 10, wherein the program instructions further cause the computer to:

send a notification to a developer of the downstream platform-specific file corresponding to the heterogeneous computing platform regarding the set of changes made to the upstream file corresponding to the computing platform of the parent software project on which the downstream platform-specific file was based.

* * * * *